(12) United States Patent
Roberts et al.

(10) Patent No.: US 8,718,482 B1
(45) Date of Patent: May 6, 2014

(54) TRANSPARENT CLOCK FOR PRECISION TIMING DISTRIBUTION

(75) Inventors: Harold A. Roberts, Prior Lake, MN (US); Christopher T. Bernard, Wayzata, MN (US); Jason W. Dove, Novato, CA (US); Berkay Baykal, Westborough, MA (US)

(73) Assignee: Calix, Inc., Petaluma, CA (US)

( * ) Notice: Subject to any disclaimer, the term of this patent is extended or adjusted under 35 U.S.C. 154(b) by 467 days.

(21) Appl. No.: 12/942,617

(22) Filed: Nov. 9, 2010

Related U.S. Application Data

(60) Provisional application No. 61/259,920, filed on Nov. 10, 2009, provisional application No. 61/352,748, filed on Jun. 8, 2010.

(51) Int. Cl.
*H04B 1/7087* (2011.01)

(52) U.S. Cl.
USPC .............................. 398/161; 398/53; 398/102

(58) Field of Classification Search
USPC ........ 398/98–102, 161; 370/395.21, 517–520
See application file for complete search history.

(56) References Cited

U.S. PATENT DOCUMENTS

| | | | | |
|---|---|---|---|---|
| 5,793,976 | A * | 8/1998 | Chen et al. ..................... | 709/224 |
| 6,532,274 | B1 | 3/2003 | Ruffini | |
| 6,636,987 | B1 | 10/2003 | Ruffini | |
| 6,707,829 | B1 * | 3/2004 | Hanks et al. ................... | 370/519 |
| 6,711,411 | B1 | 3/2004 | Ruffini | |
| 6,769,029 | B1 * | 7/2004 | Seki et al. ...................... | 709/232 |
| 6,785,237 | B1 * | 8/2004 | Sufleta .......................... | 370/236 |
| 7,773,606 | B2 * | 8/2010 | Dobjelevski et al. .... | 370/395.62 |
| 7,953,324 | B2 | 5/2011 | Leung et al. | |
| 8,018,972 | B2 * | 9/2011 | Roberts et al. ................. | 370/507 |
| 2005/0213595 | A1 * | 9/2005 | Shimizu ......................... | 370/428 |
| 2007/0116064 | A1 * | 5/2007 | Kim et al. ...................... | 370/508 |
| 2010/0020829 | A1 * | 1/2010 | Ruffini .......................... | 370/509 |
| 2010/0040369 | A1 * | 2/2010 | Zhao et al. ...................... | 398/58 |
| 2010/0085989 | A1 * | 4/2010 | Belhadj et al. ................. | 370/503 |

(Continued)

FOREIGN PATENT DOCUMENTS

| | | |
|---|---|---|
| EP | 1145477 B1 | 11/2007 |
| WO | 0042728 A1 | 7/2000 |

(Continued)

OTHER PUBLICATIONS

Delay. (2001). In Hargrave's Communications Dictionary, Wiley. Retrieved from http://www.credoreference.com/entry/hargravecomms/.*

(Continued)

*Primary Examiner* — David Payne
*Assistant Examiner* — Tanya Motsinger
(74) *Attorney, Agent, or Firm* — Shumaker & Sieffert, P.A.

(57) ABSTRACT

One or more devices of a network having asymmetric delay are configured to participate in time synchronization protocol sessions in which a client device synchronizes its local clock to a master device. In one example, a system includes an optical line terminal configured to receive a time synchronization protocol packet from a grandmaster clock and an optical network unit (ONU) configured to calculate a residence time of the time synchronization protocol packet, encode the residence time into the packet, and to forward the packet to a client device. Moreover, the system may participate in a plurality of time synchronization protocol sessions with a plurality of client devices, such that the client devices become synchronized in frequency and phase.

28 Claims, 13 Drawing Sheets

(56) References Cited

U.S. PATENT DOCUMENTS

| | | | |
|---|---|---|---|
| 2010/0085990 A1* | 4/2010 | Belhadj et al. | 370/517 |
| 2010/0172647 A1* | 7/2010 | Luo et al. | 398/66 |
| 2010/0208752 A1 | 8/2010 | Julien et al. | |
| 2010/0278055 A1 | 11/2010 | Barry et al. | |
| 2011/0051754 A1* | 3/2011 | Lansdowne | 370/503 |
| 2011/0064091 A1* | 3/2011 | Darras et al. | 370/458 |
| 2012/0008937 A1 | 1/2012 | Cheng et al. | |
| 2012/0106976 A1* | 5/2012 | Bernard et al. | 398/154 |
| 2013/0028265 A1* | 1/2013 | Ronchetti et al. | 370/400 |

FOREIGN PATENT DOCUMENTS

| | | | |
|---|---|---|---|
| WO | 0120828 | A1 | 3/2001 |
| WO | 0239630 | A2 | 5/2002 |
| WO | 2008051123 | A1 | 5/2008 |
| WO | 2010039258 | A1 | 4/2010 |
| WO | 2010097111 | A1 | 9/2010 |
| WO | 2011050844 | A1 | 5/2011 |
| WO | 2011144263 | A1 | 11/2011 |

OTHER PUBLICATIONS

U.S. Appl. No. 13/503,681, entitled "Method and Apparatus for Optimizing Packet Timing Transport," filed Apr. 24, 2012, in re application of Staefano Ruffini et al.

ITU-T G.984.3, Series G: Transmission Systems and Media, Digital Systems and Networks, Digital sections and digital line system-Optical line systems for local and access networks, Gigabit-capable Passive Optical Networks (G-PON): Transmission convergence layer specification, International Telecommunications Union, Mar. 2008, 146 pages.

IEEE P1588 D2, Draft Standard for a Precision Clock Synchronization Protocol for Networked Measurement and Control Systems, 2008, 365 pages.

ITU-T G.984.2, Amendment 2, Series G: Transmission Systems and Media, Digital Systems and Networks, Digital sections and digital line system—Optical line systems for local and access networks, Gigabit-capable Passive Optical Networks (G-PON): Physical Media Dependent (PMD) layer specification, International Telecommunications Union, Mar. 2008, 14 pages.

IEEE 1588, It's About Time, White Paper, Real Time Automation, 2008, 4 pages, www.rtaautomation.com.

IEEE 1588 Overview, IEEE 1588 Unplugged—An Introduction to IEEE 1588, Real Time Automation, Retrieval date Nov. 9, 2009, 2 pages, www.rtaautomation.com/ieee1588/.

U.S. Appl. No. 12/942,639, filed Nov. 9, 2010, Roberts et al.

IEEE Joint ITU-T/IEEE Workshop on the Future of Ethernet Transport, Q13 Activities on Time Synchronization, Geneva, May 28, 2010, 14 pages.

* cited by examiner

TRANSPARENT CLOCK FOR PRECISION TIMING DISTRIBUTION

This application claims the benefit of U.S. Provisional Application Ser. No. 61/259,920, filed Nov. 10, 2009, and U.S. Provisional Application 61/352,748, filed Jun. 8, 2010, the entire contents of each of which are incorporated by reference.

TECHNICAL FIELD

This disclosure relates to optical networks and, more particularly, communication of timing information in optical networks.

BACKGROUND

Optical networks are used to deliver voice, data and/or video services to multiple network subscribers using one or more optical fibers. The optical networks deployed to deliver the voice, data and video services may be either passive or active. In a passive optical network (PON), for example, passive optical splitters and combiners enable multiple subscribers to share the same optical fiber. Thus, the PON functions as a point-to-multipoint optical network. A PON may conform to any of a variety of PON standards, such as broadband PON (BPON) (ITU G.983), gigabit-capable PON (GPON) (ITU G.984), or gigabit-capable Ethernet PON (GE-PON or EPON) (IEEE 802.3). In an active optical network, some sort of electrically powered equipment, such as a switch, router, or multiplexer, distributes the signal to the subscriber to which the signal is destined. Thus, an active optical network, such as an active Ethernet (AE) optical network (IEEE 802.3ah), may operate as a point-to-point network.

As one example, when optical fiber extends to a premise where one or more subscriber devices are located, the service is commonly referred to as Fiber to the Premises (FTTP) or Fiber to the Home (FTTH). In FTTP/FTTH services, an optical network unit (ONU) terminates an optical fiber of the optical network, and delivers the signals on the optical fiber to subscriber devices to provide FTTP services. Subscriber devices may include, for example, televisions, set-top boxes, telephones, computers, or other network client devices. The ONU also receives signals from subscriber devices, and transmits the signals upstream via the optical network. In this manner, the ONU can support a wide variety of services, including voice, video and data services, over the optical network.

SUMMARY

In general, this disclosure describes techniques for distributing precise time-of-day indications within and through a computer network, such as a passive optical network (PON). In accordance with the techniques of this disclosure, devices in a PON may participate in a packet-based time synchronization protocol, such as the precision time protocol (PTP), to distribute a synchronization message from a master clock (also referred to as a grandmaster clock) to a client device. For example, a device of the PON may modify the value of a time stamp correction field of a PTP packet based on an amount of time the PTP packet is present in devices of the PON, e.g., from an entry point to an egress point of the PON.

The PON may include multiple components, such as an OLT, ONU, optical fiber links, passive optical splitter/combiner units, or the like. Accordingly, the time that the PTP packet is present in the PON may include time spent in such components. By modifying the value of the time stamp correction field both when the packet is passed to a client device that uses the PTP packet to synchronize its internal clock, as well as to a grandmaster device with which the client device synchronizes, the techniques of this disclosure may enable the client device to take into account asymmetric delays in packet transmission introduced by the components of the PON, as well as packet switching delay resulting from load variation.

In another example, devices in the PON may be configured to equalize time that PTP packets spend in the devices of the PON in both the downstream and the upstream direction. Computer networks such as PONs may have asymmetric delay in the downstream and upstream directions. The devices of a PON may be configured to ensure that the delay in both the downstream direction and the upstream direction is equalized, e.g., by delaying or prioritizing transmission of PTP packets.

In one example, a method includes calculating, with a device of a network having asymmetric delay, residence time of a time synchronization protocol packet within the network, adding an indication of the residence time into the packet, and forwarding the packet.

In another example, a system includes an optical line terminal (OLT) configured to receive a time synchronization protocol packet from a grandmaster clock, and an optical network unit (ONU) configured to calculate a residence time of the time synchronization protocol packet, add the residence time into the packet, and to forward the packet to a client device.

In another example, a computer-readable storage medium contains, e.g., is encoded with, instructions that cause one or more programmable processors of a network having asymmetric delay to calculate residence time of a time synchronization protocol packet, encode the residence time into the packet, and forward the packet.

In another example, a method includes receiving, with at least one device of network having asymmetric delay, a time synchronization protocol packet, storing the packet in at least one device of the network for a period of time to cause the packet to have a predetermined residence time within the network, and after releasing the packet from storage, forwarding the packet.

In another example, a device of a network having asymmetric delay includes one or more network interfaces, and a control unit configured to receive a time synchronization protocol packet via the one or more network interfaces, store the packet for a period of time to cause the packet to have a predetermined residence time within the network, and, after releasing the packet from storage, forward the packet via the one or more network interfaces.

In another example, a computer-readable storage medium includes instructions that, when executed, cause one or more processors of a network having asymmetric delay to receive a time synchronization protocol packet, store the packet in one or more devices of the network for a period of time to cause the packet to have a predetermined residence time within the network, and, after releasing the packet from storage, forward the packet.

In another example, a system includes an optical line terminal (OLT) configured to receive a time synchronization protocol packet from a grandmaster clock, and an optical network unit (ONU) configured to store the packet for a period of time to cause the packet to have a predetermined residence time within the network, and to forward the packet after releasing the packet from storage, wherein the OLT is configured to send the packet to the ONU.

The details of one or more examples are set forth in the accompanying drawings and the description below. Other features, objects, and advantages will be apparent from the description and drawings, and from the claims.

DETAILED DESCRIPTION

Packet-based time synchronization protocols, such as precision time protocol (PTP), fundamentally depend on distribution of a synchronization message from a master clock to clients (also referred to as "client devices" or "slaves") to announce the current time with configurable frequency. These synchronization messages are subject to packet processing delay and delay variations as they are switched from the master clock to the clients through a packet network. To increase the accuracy of the network clock, the clients can optionally try to measure the network packet delay and compensate for the time it takes for the synchronization message to travel through the network. Furthermore, network operators can implement an out-of-band time distribution network or utilize packet prioritization techniques to decrease the packet delay and delay variation for these protocol packets.

IEEE 1588 (which describes PTP) and network time protocol (NTP) time distribution protocols both include this fundamental concept to support synchronization to a network clock. These protocols utilize network delay measurement to increase the accuracy of the clock by using a delay measurement message that gets initiated by the client and responded to by the master clock. The client, by using a timestamp, is able to measure a round trip delay and approximate the one-way delay that the network introduces by dividing the round trip delay by two to arrive at a one-way delay measurement. It is inherently assumed that the network has symmetrical characteristics and the delay variation is not significant in these examples.

Some timing protocols such as PTP provide facilities to compensate for flight of time of protocol packets to increase the accuracy of the timing protocol. The protocol packets include a correction field which the transient network elements can use to capture the residence time for the protocol packet. The protocol identifies the network elements that do measure residence time and apply it to the protocol packets as "transparent clocks." The two types of transparent clocks are defined as 1) peer-to-peer and 2) end-to-end.

The techniques of this disclosure provide methods for allowing packet-based network synchronization protocols, such as IEEE 1588, to work accurately for frequency, phase synchronization and time of day distribution over a Passive Optical Network (PON) access network or any other access network with similar characteristics, such as variable and asymmetrical packet delay.

Figure 1:
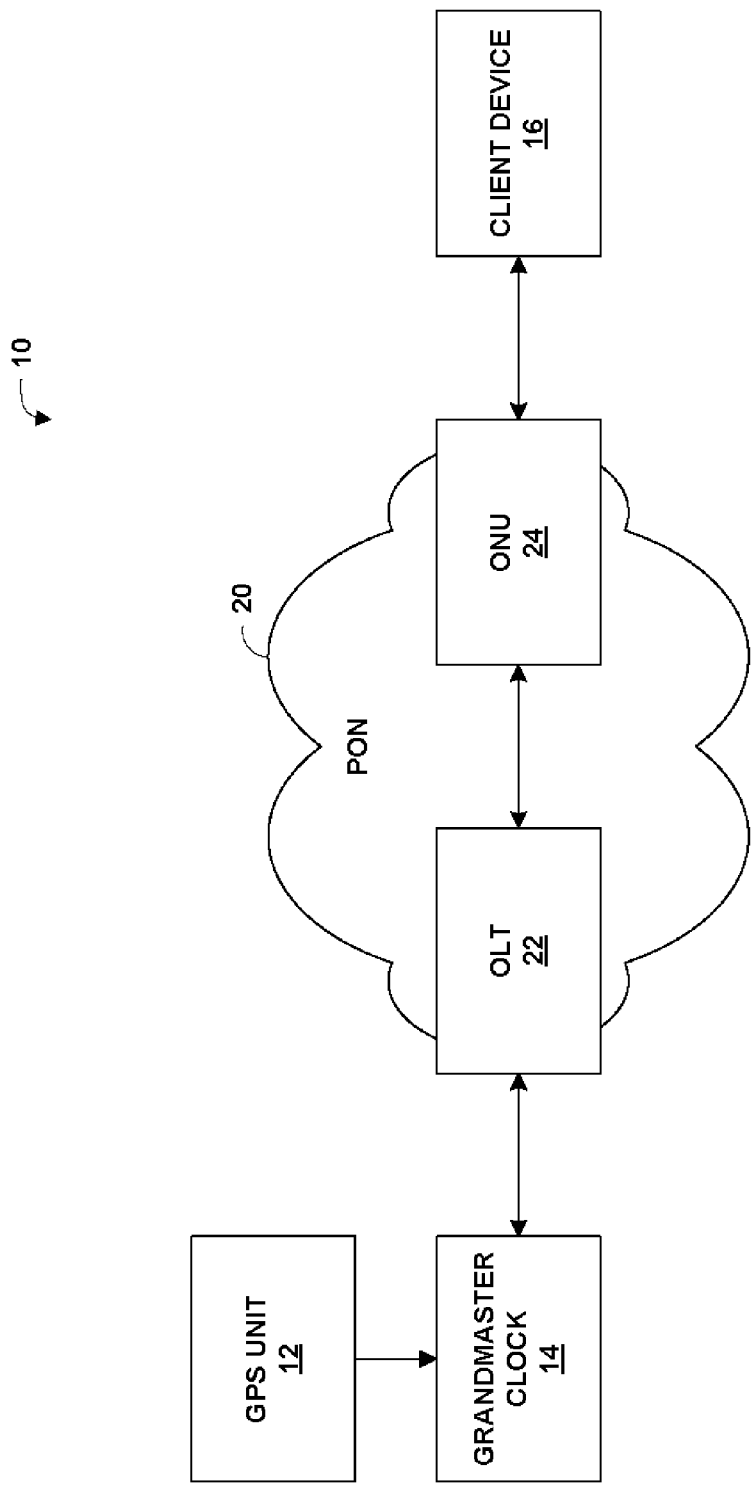
FIG. 1 is a block diagram illustrating an example system in which a passive optical network (PON) participates in precision time protocol (PTP) communications between a grandmaster clock and a client device.

FIG. 1 is a block diagram illustrating an example system 10 in which a passive optical network (PON) 20 participates in precision time protocol (PTP) communications between grandmaster clock 14 and client device 16. PTP is described in greater detail by IEEE 1588-2008, entitled "Standard for a Precision Clock Synchronization Protocol for Networked Measurement and Control Systems," which is hereby incorporated by reference in its entirety. PON 20 comprises optical line terminal (OLT) 22 and optical network unit (ONU) 24 in the example of FIG. 1, although it should be understood that PON 20 may include additional elements, such as a plurality of ONUs and one or more optical distribution frames (ODFs) coupled to one or more of the ONUs, and to OLT 22. Optical network units may also be referred to as optical network terminals (ONTs). In general, grandmaster clock 14 acts as a "master" clock for client device 16, while client device 16 acts as a slave device with respect to grandmaster clock 14. Grandmaster clock 14 may receive time-of-day data from GPS unit 12, in the example of FIG. 1, or from other clock sources. Client device 16 includes a local clock that is synchronized to grandmaster clock 14, which is in turn synchronized to GPS unit 12 (or another clock source).

In accordance with PTP, grandmaster clock 14 may send a PTP packet to client device 16, and client device 16 may send additional PTP packets to grandmaster clock 14, e.g., delay request packets. In general, grandmaster clock 14 generates PTP packets that include a time value corresponding to the time of grandmaster clock 14. Client device 16 may calculate the round trip time as the time encoded in the PTP packet (that is, the time of the local clock of client device 16 when the delay request packet was generated) subtracted from the time of client device 16 when the PTP packet is ultimately received by client device 16, less the value of the time stamp correction field. Client device 16 measures the round trip time of a packet that travels from itself to grandmaster clock 14 via PON 20 and back to measure propagation delay, in order to accurately synchronize the clock of client device 16.

Packet switched systems typically introduce packet delay and packet delay variation, which is dependent on many factors, such as the internal architecture of the system, interface speeds, propagation delay through the system and distance of links connecting the systems, current load conditions, and other such factors. PON systems such as PON 20 typically have an asymmetrical packet delay when comparing downstream (packet traversing from OLT to ONU) and upstream paths (packet traversing from the ONU to the OLT) since the upstream direction is a multipoint to point connection where each ONU is given a time slot to communicate. The packet delay variation between upstream and downstream can be a millisecond or more in a PON system. PON 30 may therefore implement a solution to make packet based timing protocols more effective.

Client device 16 may comprise a cellular (i.e., mobile wireless) base station or other device that requires a precise time-of-day synchronization with grandmaster clock 14. The base station may support communication with wireless communication devices such as mobile telephone handsets or other mobile wireless computing devices. In some examples, PON 20 may provide so-called backhaul services for client device 16, such as mobile backhaul services that communicate information between the client device (e.g., a cellular base station) and other network components. Additionally, grandmaster clock 14 may act as a master clock to a plurality of additional client devices, e.g., other base stations, in order to synchronize each of the client devices with the same precisely measured time of day. In such examples, PON 20 may include a plurality of ONUs, each of the plurality of ONUs corresponding to a respective one of the base stations. Additionally or alternatively, grandmaster clock 14 may be coupled to one or more client devices via different PONs. The techniques of this disclosure may result in synchronization of clocks of one or more slave devices, such as client device 16, with grandmaster clock 14 such that the synchronization of the clocks is accurate, in some examples, to within ±50 nanoseconds (ns).

The techniques of this disclosure recognize that PONs, such as PON 20, typically introduce asymmetric delays. That is, propagation delay in the downstream direction (that is, from optical line terminal (OLT) 22 to optical network unit (ONU) 24) is different than propagation delay in the upstream direction (that is, from ONU 24 to OLT 22). In recognition of this asymmetric delay, rather than simply measuring the round trip time and dividing by two to calculate the propagation delay between grandmaster clock 14 and client device 16, the techniques of this disclosure include measuring the delay in the downstream direction and communicating this delay to client device 16. In some examples, the upstream delay is also communicated to client device 16.

In one example, PON 20 may act as a distributed transparent clock. In general, as described in this disclosure, a transparent clock measures residence time of a PTP packet. Residence time, with respect to the example of FIG. 1, is the time spent within PON 20. For example, the residence time may correspond to the difference between a time when a PTP packet is ultimately output by ONU 24 (and thus, exiting PON 20) and a time when the PTP packet was received by OLT 22 (in the downstream direction, thus, entering PON 20). Residence time also may include the time a PTP packet spends in PON 20 in the upstream direction, that is, the difference between a time when the packet is ultimately output by OLT 22 (and thus, exiting PON 20) and a time when the packet is received by ONU 24 (thus, entering PON 20). When PON 20 acts as a transparent clock, PON 20 may be referred to as a distributed transparent clock, because PON 20 comprises a plurality of network elements, e.g., OLT 22 and ONU 24. It is assumed, for examples in which PON 20 acts as a distributed transparent clock, that each element of PON 20 includes a local clock, and that the clocks of each element of PON 20 are synchronized with each other. However, the clocks of PON 20 need not necessarily be synchronized to grandmaster clock 14. In this manner, a transparent clock may measure residence time using either a free running local clock or a traceable clock.

In general, when PON 20 acts as a transparent clock, PON 20 may inform client device 16 of propagation delay in the downstream direction. In one example, ONU 24 of PON 20 is configured to set a value of a time stamp correction field of a PTP packet according to the residence time of the PTP packet in the downstream direction within PON 20. Transparent clocks may be classified in two different categories: end-to-end transparent clocks and peer-to-peer transparent clocks.

An end-to-end transparent clock is a transparent clock that supports the use of an end to-end delay measurement mechanism between a master clock and slave clocks, e.g., grandmaster clock 14 and client device 16 (respectively). End-to-end transparent clocks do not require other network elements in the network topology to implement PTP. When PON 20 is configured to operate as an end-to-end clock, PON 20 measures internal transit delays for a PTP packet and applies these measured values to the PTP packet based on the residence time in the clock. PON 20, as an end-to-end transparent clock, does not need to correct for path delay on either ingress or egress ports.

When PON 20 is configured as an end-to-end transparent clock, ONU 24 of PON 20 may calculate residence time of a PTP packet in the downstream direction for PON 20 received from grandmaster clock 14. ONU 24 may encode this information in a time stamp correction field of the PTP packet and send the packet to client device 16. Client device 16 may record an identifier of the packet, along with the value of the time stamp correction field, e.g., in a computer-readable medium of client device 16. Client device 16 may then create a new PTP packet in response to receiving the PTP packet from grandmaster clock 14 and send the newly created PTP packet to grandmaster clock 14 via PON 20. OLT 22 may then calculate the residence time of the packet in the upstream direction and encode the upstream residence time in the time stamp correction field of the packet and forward the packet to grandmaster clock 14.

As an end-to-end transparent clock, PON 20 measures both the downstream and upstream internal delays and adjusts a time stamp correction field of a PTP packet accordingly. In this way, a master and a slave can use a round trip delay measurement to determine the entire end to end system delay and can at least roughly determine the one way downstream delay by dividing the round trip delay (RTD) by 2. The asymmetry of PON 20 can be removed via the time stamp correction and the more or less symmetrical delays will be removed by the round trip delay calculation.

Grandmaster clock 14, or another device comprising grandmaster clock 14, may be configured to initially generate a PTP packet to synchronize a clock of client device 16. ONU 24 may be configured to set a time stamp correction field of the PTP packet to reflect the residence time of the PTP packet within PON 30, and to forward the PTP packet to client device 16 after setting the value of the time stamp correction field. Client device 16 may be configured to create and send a delay request packet to grandmaster clock 14, in order to differentiate between asymmetric and symmetric delay along the path from grandmaster clock 14 to client device 16. That is, client device 16 may initially set the value of its local clock to a time equal to the value of the timestamp of the PTP packet from grandmaster clock 14 plus the value of the time stamp correction field set by PON 30, and then further calculate symmetric delay along the path using a delay request packet.

Client device 16 may include a timestamp value in the delay request packet that corresponds to the value of the local clock of client device 16 at which client device 16 sent the delay request packet. Client device 16 may then send the delay request packet to grandmaster clock 14 via PON 30, and grandmaster clock 14 may forward the delay request packet back to client device 16 via PON 30. PON 30 may set the value of a time stamp correction field in the delay request packet in both the upstream and downstream directions, such that the value of the time stamp correction field reflects the total delay (in both the upstream and downstream directions) introduced by PON 30.

When client device 16 receives the delay request packet, client device 16 may first calculate the round trip time for the packet by calculating the difference between the current time of the local clock for client device 16 and the timestamp of the delay request packet. Client device 16 may then subtract the value of the time stamp correction field from the calculated difference, to determine the round trip symmetric delay, then divide by two to find the one-way symmetric delay. Client device 16 may then update the value of its local clock by adding the one-way symmetric delay to the current time of the local clock to synchronize the local clock with grandmaster clock 14.

For the example discussed above, it is assumed that PON 30 acts as an end-to-end transparent clock. In another example, PON 20 may be configured as a peer-to-peer transparent clock. A peer-to-peer transparent clock is a transparent clock that, in addition to providing PTP event transit time information, also provides corrections for propagation delay of the link connected to the port receiving a PTP event message. When PON 20 is configured as a peer-to-peer transparent clock, PON 20 may provide correction for propagation delay of the link between grandmaster clock 14 and OLT 22 when PTP event packets are received by OLT 22 from grandmaster clock 14. In the presence of peer-to-peer transparent clocks, delay measurements between slave clocks and the master clock may be performed using the peer-to-peer delay measurement mechanism. When PON 20 is configured as a peer-to-peer transparent clock, it is assumed that all elements in a peer-to-peer topology implement PTP. The slave clocks (e.g., client device 16) downstream from a peer-to-peer transparent clock do not necessarily need to implement delay measurements, as synchronization packets provided by the peer-to-peer transparent clock may already have the residence time of the PTP packet measured by the transparent clock.

In this example, when PON 30 receives a PTP packet from grandmaster clock 14, PON 30 sets the value of the time stamp correction field of the PTP packet to reflect the delay associated with the link between grandmaster clock 14 and PON 30, as well as the downstream residence time of the PTP packet. Client device 16 may further determine the delay between itself and PON 30, and may therefore synchronize its local clock with grandmaster clock 14 without the use of a delay request packet. That is, client device 16 may set the value of its local clock equal to the value of the timestamp of the PTP packet plus the value of the time stamp correction field plus the delay of the link between PON 30 and client device 16. Link delay may be calculated prior to performing the techniques of this disclosure, and may be a known value based on link medium, link length, and/or other attributes of the link.

For examples in which PON 20 is configured as a peer-to-peer clock, client device 16 may set a local clock once a PTP packet is received from grandmaster clock 14 via PON 20 in the downstream direction, without sending the PTP packet back to grandmaster clock 14. That is, because PON 20 determines propagation delay of the link between grandmaster clock 14 and OLT 22, in these examples, client device 16 will have all the information necessary to synchronize a local clock of client device 16 with grandmaster clock 14. In particular, the propagation delay from grandmaster clock 14 to client device 16 is reflected by the PTP packet by PON 20 in these examples, and therefore, client device 16 may immediately synchronize its local clock based on the timestamp of the PTP packet from grandmaster clock 14 and the propagation delay of the link between grandmaster clock 14 and OLT 22.

As a 'peer to peer' transparent clock, PON 20 need only measure the downstream delay, i.e., from OLT 22 to ONU 24. However, in a peer to peer system, PON 20 is also responsible for calculating a round trip delay measurement of the link coming from the nearest network element toward grandmaster clock 14. For example, when PON 20 is directly connected to grandmaster clock 14, PON 20 may calculate the round trip delay measurement of the link between OLT 22 and grandmaster clock 14. As another example, if a device (e.g., a router) is positioned between grandmaster clock 14 and PON 20, and is directly connected to OLT 22 of PON 20, PON 20 may calculate the round trip delay measurement of the link between OLT 22 and the device (e.g., the router). In addition, in such examples, each network element functions as a peer-to-peer transparent clock.

In general, it is not necessary for PON 20 to have a traceable time of day to grandmaster clock 14 when PON 20 acts as a transparent clock (either as an end-to-end or peer-to-peer transparent clock). Whether PON 20 acts as an end-to-end transparent clock or as a peer-to-peer transparent clock, PON 20 is merely responsible for informing client device 16 of delay of PON 20, and in the case of the peer-to-peer transparent clock, for the link just upstream of PON 20 as well (that is, the link connected to OLT 22 and a device external to PON 20). However, if OLT 22 is synchronized to a traceable clock indicating a time of day and the traceable time of day is accurately distributed to ONU 24, which is associated with OLT 22 in the example of FIG. 1, PON 20 can also support other protocols that require delay measurement. One such example is Ethernet OAM (ITU Y.1731) where the system measures one-way delay on a per service basis.

In one example, to properly account for residence time—time that a PTP packet spends within devices of PON 20—(and in particular, to communicate time of arrival of the PTP packet from OLT 22 to ONU 24), OLT 22 adds a non-standard (that is, non-protocol), internal PON timestamp field to the PTP packet with the time of day of PON 20. The time of day could also be the global time of day (synchronized to, for example, grandmaster clock 14), but this is not necessary. This time stamp is then read and removed by ONU 24, which uses the time stamp to determine the time of arrival of the packet at OLT 22. ONU 24 may include its own local time of day (e.g., received via a distribution method similar to PTP). ONU 24 would then have the transit time of the PTP packet across PON 20 and is able to update the time stamp correction field of the PTP packet properly. In the example of PON 20 acting as a peer to peer transport clock, PON 20 measures the delay time of the upstream link to the next peer-to-peer element, that is, the device external to PON 20 coupled to OLT 22.

In particular, OLT 22 and/or ONU 24 of PON 20 may identify the protocol packet (by setting the value of the Ether Type field of the Ethernet header and destination MAC address fields in case of IEEE-1588 PTP packets, or other OSI Layer Two and/or Layer Three fields for other protocols) and temporarily modify the packet to carry a timestamp to capture the time of day entry to PON 20. When the packet is ready to exit PON 20, ONU 24 removes the temporary timestamp and modifies the packet to capture the resident time. In some examples, ONU 24 also recalculates any cyclical redundancy check (CRC) fields of the PTP packet, as well as any other protocol fields that depend on the content of the protocol packet, such as any hash marks used to authenticate the content of the message. ONU 24 may apply these changes to the packet at the data path with hardware assist to avoid any additional delays that may be introduced. Where applicable, ONU 24 predicts such delays and factors these predictions into the calculation of the residence time. For example, when an authentication scheme such as MD-5 hash is used, OLT 22 distributes the shared key required for the algorithm to ONUs of PON 20, such as ONU 24, using a secure protocol.

The techniques of this disclosure, in some examples, may satisfy the requirement of providing the highest possible quality of service (QoS) treatment to the timing protocol packets, but even with appropriate quality of service treatment, packet delay variation will likely be present. The techniques may both remove variation based on changing loads and also account for the inherent asymmetry of PON systems such as PON 20.

In still another example, OLT 22 may detect PTP packets or other packet based time synchronization protocol packets (such as NTP packets). For such time synchronization protocol packets (that is, not for standard data packets forwarded through PON 20), OLT 22 queues these time synchronization packets for a period of time such that the downstream propagation time is approximately equal to the upstream propagation time. In this manner, OLT 22 effectively causes the propagation delays in both the upstream and downstream directions through PON 20 to be symmetric. In this example, client device 16 may, upon receiving the round trip time calculated by grandmaster clock 14, simply divide the round trip time by two and use this quotient as the offset to be applied to the timestamp from grandmaster clock 14. In this example, devices of PON 20 avoid modification of the PTP packet itself. Hence, because the PTP message does not require modification, in some examples, this equalization technique may operate outside of the PTP protocol and require no modification to the protocol. By avoiding modification of the PTP packet, OLT 22 and/or ONU 24 avoid the necessity of being configured with additional information that would otherwise be required to appropriately modify the packet in some examples, such as a secret key if hashing is used.

In some examples, grandmaster clock 14 may be a device of a central office of a service provider or other user. Moreover, grandmaster clock 14 need not be coupled directly to OLT 22 of PON 20, but may be coupled via one or more network devices, e.g., devices forming an edge network. Similarly, ONU 24 of PON 20 need not be directly coupled to client device 16, but may instead be coupled to client device 16 via one or more additional network devices, e.g., devices forming an edge network.

Moreover, although generally described with respect to the example of PTP packets, it should be understood that the techniques of this disclosure may be generally applicable to any precision time distribution protocol. For example, these techniques may also be applied to network time protocol (NTP).

In some examples of this disclosure, PON 20 may queue (e.g., buffer) packets in both the downstream and the upstream directions to introduce delay sufficient to cause PTP packets in both the downstream and the upstream directions to have the same residence time within PON 20. Introduction of delay into downstream and/or upstream PTP packets may be performed by a PTP equalizer unit of OLT 22 and/or ONU 24. Such techniques of causing downstream and upstream PTP packets to have approximately equal delays may be referred to as "PTP equalization." Suppose, for example, that the downstream residence time for a PTP packet is a time of X and the upstream residence time for a PTP packet is a time of Y, without buffering. PON 20 may include one or more PTP equalization units, e.g., within OLT 22, ONU 24, or both, that introduce delay for both the downstream and the upstream directions such that PTP packets in either direction have a substantially or identically equivalent residence time of N. That is, PON 20 may introduce delay of (N-X) for the downstream PTP packet and delay of (N-Y) for the upstream PTP packet. OLT 22 and/or ONU 24 may include memory and clocks for buffering PTP packets in either or both directions, such that PTP packets have approximate equal residence times within devices of PON 20. In this manner, in the aggregate, PTP packets may spend approximately equal times in PON 20 in both the downstream and the upstream directions.

The IEEE 1588 protocol does not use a single round trip delay measurement to determine RTD, but rather averages the delays over a period of time. Accordingly, it is not necessary that all PTP messages have identical upstream and downstream delays. In some examples, PON 20 may attempt to cause PTP packets to have approximately equal delays over a time average. However, even with delay variations, the techniques of this disclosure may allow fast convergence of the estimate based on averages to an accurate approximation of the long term delays. When the downstream delay is shorter (or longer) than the upstream delay for seconds or minutes but averages to be equal in delay after hours or days, the algorithm for estimation may be defeated unless the averaging take place over hours or days. This disclosure recognizes that it may not be practical to wait this long for convergence.

Therefore, this disclosure provides examples that may provide for fast convergence to an accurate, one-way delay value that may cause all PTP packets to be delayed to the same amount of time in the upstream and downstream directions. This delay may be a value that is longer than the longest normal one way delay in either the upstream or downstream. The upstream may be responsible for the majority of the packet delay due to the PON scheduling mechanism. This delay, or "Residence Time," can be as long as a frame size, where a frame may correspond to a unit of data transmitted between OLT 22 and ONU 24. In some examples, the frame size in the upstream may be equal to 1 millisecond. Therefore, a value of 1 millisecond may be used in some examples. In some examples, a longer delay may be used, as the magnitude of the delay of PTP messages does not typically affect the user experience.

In examples where PON 20 (and in particular, devices of PON 20, such as OLT 22 and ONU 24) implements the transfer of the local Time of Day (ToD), then PON 20 may delay-equalize the PTP packets by attaching a Time of Arrival (ToA) message to the PTP message upon entry to PON 20 (e.g., at a user network interface (UNI) of ONU 24, coupled to client device 16, or at a service network interface (SNI) of OLT 22). Once the PTP packet has traversed PON 20, e.g., either from OLT 22 to ONU 24 or from ONU 24 to OLT 22, ONU 24 (and/or OLT 22, in some examples) may buffer the PTP message until the predetermined Residence Time has expired (as measured by the ToA stamp vs. the local ToD) and send the packet out of the UNI (or SNI) at the time of expiration. In some examples, this can be implemented using a simple, fixed Calendar Queue. A calendar queue generally indicates times at which to transmit units of data, and is stored in temporal order such that a dequeue operation returns the earliest temporal unit stored in the queue.

This approach may provide one or more advantages. For example, this approach may allow a rapid estimate of an accurate, long term round trip delay. ONU 24 may include a system-on-chip (SoC) ASIC, whereby visibility into MAC-layer data may not be available to other components of ONU 24. Assuming that the ToD synchronization can be done between OLT 22 and ONU 24, an SoC ASIC-based ONU can use this method.

In some cases, the Calendar Queue may operate at a rate based on a system clock rate of PON 20. The resulting departure rates of the PTP messages may be 'impressed' with this clock as they are scheduled according to the 'tics' of this clock. Unlike a circuit emulation service (CES) such as a pseudowire emulation edge-to-edge (PWE3) service, the PTP packet rates will likely not be a constant, so beating between the PTP packet rate and the Calendar Queue rate seems unlikely. Accordingly, PON 20 may be configured to randomly 'dither' the Calendar Queue output by a small amount to avoid beating.

In some examples of this disclosure, OLT 22 may provide symmetric delay between an SNI of OLT 22 and an S/R interface, which may be coupled to ONU 24. That is, the delay caused by OLT 22 to PTP packets may be approximately equal in each direction (downstream and upstream). In some examples, ONU 24 may be FPGA-based, and may have access to upstream MAP messages and be able to determine a delay before a PTP packet can be sent upstream on an optical fiber connection to OLT 22. By knowing arrival time and departure time of a PTP packet to and from ONU 24, ONU 24 can determine the Residence Time within ONU 24. The asymmetrical optical data network (ODN) fiber delay may be small and, therefore, may be ignored, or this delay may also be taken into account for greater accuracy by using the local time-domain equalizer (Teq) typically available from the ranging process of ONU 24. After the PTP upstream packet delay is determined, ONU 24 may delay the next PTP packet in the downstream an amount approximately equal to the upstream delay that was just measured. In some cases, the upstream delay may be approximated or predicted. If the PTP packet rate is not symmetrical, multiple downstream packets may be delayed by an amount approximately equal to the last upstream delay or conversely an upstream packet delay may be discarded if another upstream packet arrives with no downstream arrivals. Alternatively, OLT 22 may average upstream delays in a running average, and may delay the downstream packets based on the running average.

In some examples, ONU 24 may not have access to upstream MAP messages. That is, ONU 24 may not have visibility into the mapping of PTP messages into frames transmitted from ONU 24 to OLT 22, in some examples, e.g., where ONU 24 is implemented using an SoC ASIC produced by an entity other than the producer(s) of other components of ONU 24. However, ONU 24 may have access to external factors, such as the laser burst enable signal from the SoC ASIC that receives the MAP messages. ONU 24 may, in some examples, apply a separate high priority virtual local area network (VLAN) to all PTP messages, which may cause the PTP messages to be in the first traffic container (T-CONT) scheduled for transmission. In this way, the external ONU logic can determine the Residence Time of the PTP packet in the upstream and delay the downstream equally. It may be assumed that the downstream delay is fixed, since there may not be visibility to the downstream packet arrival rate from the SoC ASIC either. One may experimentally determine the fixed delays in ONT 24 for the upstream and downstream and apply the variable delay (based on laser enable) on top of the fixed delays.

In some examples, OLT 22 may apply a downstream delay based on externally visible aspects, such as, for example, packet size and rates or average measurements of the laser duty cycle. That is, OLT 22 may calculate times at which packets of various sizes and/or packet transmission rates are transmitted in accordance with the laser duty cycle. This cycle may correspond to when ONUs are permitted to transmit data to OLT 22, resulting in various upstream laser bursts from the ONUs to OLT 22. In some examples, rather than implementing a PTP equalizer within ONU 24, the PTP equalizer techniques may be implemented, partially or fully, within OLT 22. OLT 22 may include all of the necessary information such as the MAP for each per-ONU upstream burst, the per-ONU equalization time, and knowledge of the residence time of the downstream and upstream packets within OLT 22. OLT 22 may apply a high priority flow at ONU 24 for all PTP messages to ensure that the PTP message is at the head of the line for each upstream burst.

In some examples, OLT 22 and/or ONU 24 may interrupt transmission of a packet currently being transmitted in order to transmit a PTP packet. This is another example of prioritizing PTP packets over other packets. Alternatively, OLT 22 and/or ONU 24 may adjust a time at which to begin sending a packet that was otherwise scheduled to be transmitted before the PTP packet. As an example, OLT 22 and/or ONU 24 may be configured to anticipate that a PTP packet is nearing the end of its timer in a calendar queue and to halt traffic to be sent soon before the PTP packet, e.g., within 10 microseconds before the PTP packet is to be sent.

In one example, a PTP equalizer unit may be implemented by OLT 22 and/or ONU 24 to set up a "Calendar Queue" at the outbound interface to delay a PTP packet until a time limit is up, e.g., a 2 millisecond time limit. OLT 22 and/or ONU 24 may also have the job of forwarding other packets, such as user traffic and management messages as well. Assume, for example, that ONU 24 is in the process of sending out a relatively long, e.g., 1588 byte packet, at the time ONU 24 determines is appropriate to send out the PTP packet. This would pose a problem even if the PTP packet has the highest quality of service (QoS) priority. It may take 1588×8=12704 bits to send this packet intact. If the relatively long packet had just started being sent when the PTP message was scheduled to be sent, then the PTP packet would need to wait 12704 bits to get to the head of the line. Ignoring overhead and assuming 1.25 Gbits per second signaling speed, the PTP packet would wait 12,707/1,250,000,000 seconds=10 microseconds to send the packet. Such a delay may be unacceptable in a system desiring an accuracy of less than 1 microsecond. Similar problems may occur when attempting to send a number of PTP packets all within a short period of time. This issue may be referred to as "head of line blocking."

One example for overcoming head of line blocking is to anticipate that the PTP packet is getting to the end of its timer in the calendar queue and to halt traffic at a threshold time before the scheduled time to send the PTP packet, e.g., at least 10 microseconds before the PTP packet is to be sent. This may add delay and jitter to the user data, but may benefit the PTP packet by ensuring that the PTP packet is sent at the earliest possible time when transmission is possible from ONU 24 to OLT 22.

The techniques of this disclosure include another example for overcoming this head of line blocking, such that the addition of asymmetrical delay may be reduced. Rather than trying to equalize all packets, this example may take advantage of averaging to be performed in 1588 adaptive algorithms. When a PTP packet is to be delayed for equalization by a certain amount, such as 5 microseconds beyond the desired delay, OLT 22 and/or ONU 24 may store a value corresponding to this amount in a register. A pointer within a calendar queue for the next PTP message can be adjusted to send the packet an amount earlier than planned, to compensate for the delay of the earlier packet. If that is done successfully, the amount of 'advance' that the second PTP packet was given can be subtracted from the delay value in the delay register, bringing the register back to a value of zero or close to zero. Of course, with head of line blocking, the packet may leave the OLT 22 or ONU 24 later than planned, so the register may still have a positive number in it, but may be compensated again by advancing a subsequent packet by an amount approximately equal to the value in the delay register. The goal of the calendar queue may be to adjust to a delay error that averages to be zero over time. This method may also work for PTP vs. PTP packet blocking (e.g., head of line blocking). As still another example, OLT 22 and/or ONU 24 may be configured to simply discard a PTP packet when the PTP packet cannot be sent at the proper time.

Figure 2:
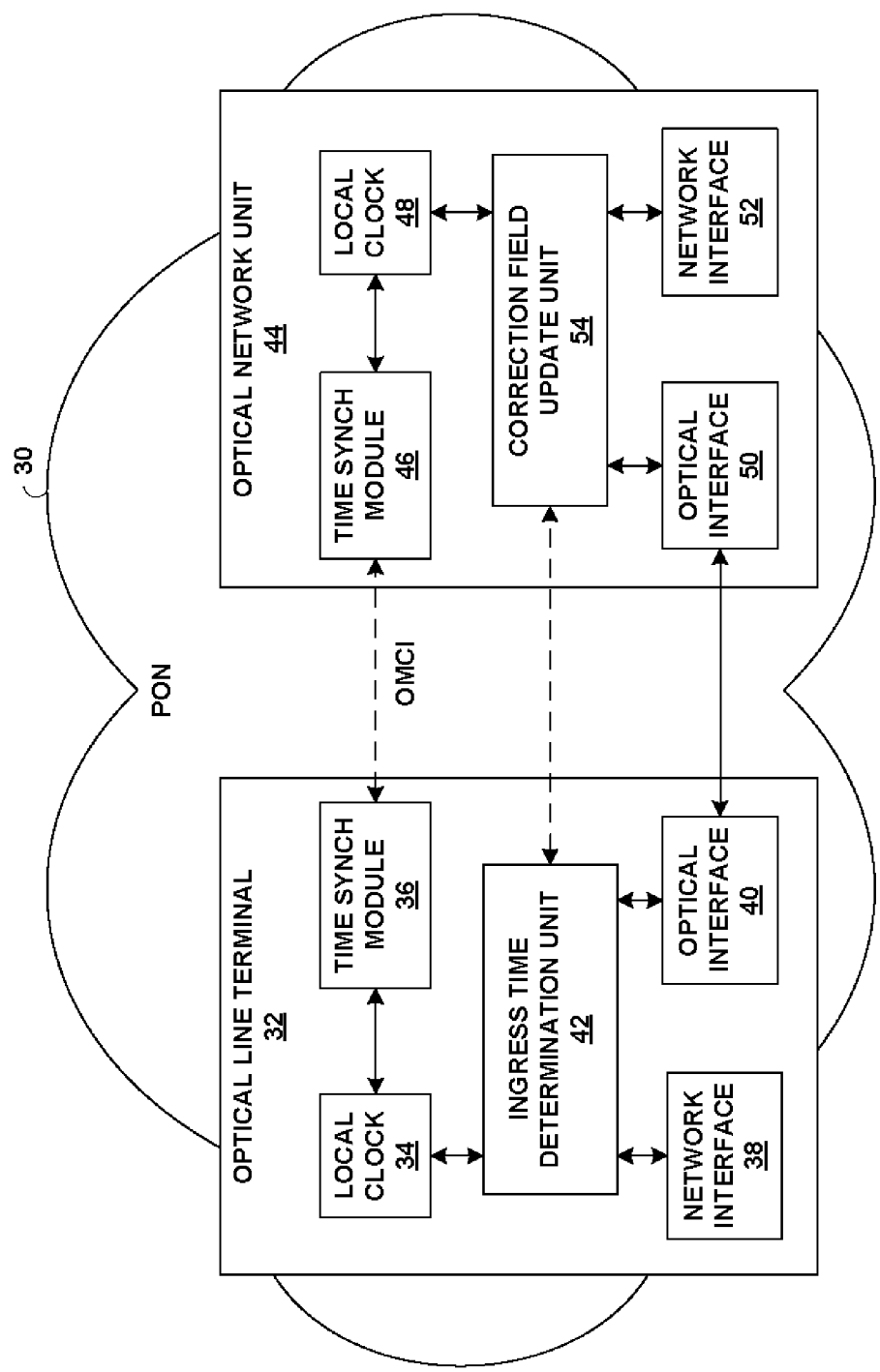
FIG. 2 is a block diagram illustrating an example PON having devices that cause the PON to act as a distributed transparent clock.

FIG. 2 is a block diagram illustrating an example PON 30 that acts as a distributed transparent clock. PON 30 includes OLT 32 and ONU 44. In the example of FIG. 2, OLT 32 includes network interface 38, local clock 34, time synchronization (synch) module 36, ingress time determination unit 42, and optical interface 40. ONU 44 includes time synch module 46, local clock 48, correction field update unit 54, optical interface 50, and network interface 52.

In general, local clock 34 and local clock 48 are synchronized to each other. However, local clock 34 and local clock 48 need not necessarily be synchronized to an external global clock, such as grandmaster clock 14 (FIG. 1). Time synch module 36 and time synch module 46 are generally responsible for ensuring that local clock 34 and local clock 48 remain synchronized. For example, time synch module 36 and time synch module 46 may exchange ONT management and control interface (OMCI) messages to synchronize local clock 34 and local clock 48. Clock synchronization for local clocks of PON system elements is described in greater detail by ITU G.984.4, "Gigabit-capable Passive Optical Networks (G-PON): ONT management and control interface specification," February 2008, the entire contents of which are hereby incorporated by reference.

The connection between time sync module 36 and time synch module 46 in FIG. 2 is represented using a dashed line to indicate that this connection is a logical link. The logical link may correspond to one of several logical links carried via a physical optical fiber link that couples optical interface 40 to optical interface 50. As discussed with respect to FIG. 1, PON 30 may further include an ODN intermediate to optical interface 40 and optical interface 50. Likewise, PON 30 may comprise additional ONUs also coupled to optical interface 40. Although only one optical interface (which may convert data between optical and electrical representations) is shown in FIG. 2, it should further be understood that OLT 32 may comprise a plurality of optical interfaces similar to optical interface 40, each of which may be coupled to a respective ODN, which in turn may be connected to one of a plurality of ONUs.

Network interface 38 and network interface 52 may comprise any network interface, such as, for example, Ethernet interfaces, SONET interfaces, or asynchronous transfer mode (ATM) network interface cards. Network interface 38 may be downstream from a grandmaster clock, such as grandmaster clock 14 (FIG. 1). Network interface 52 may be upstream from a client device, such as client device 16 (FIG. 1). Likewise, OLT 32 may correspond to OLT 22 (FIG. 1) and ONU 44 may correspond to ONU 24 (FIG. 1).

In general, PON 30 of FIG. 2 is configured to act as a transparent clock. PON 30 may be configured to act either as an end-to-end transparent clock or as a peer-to-peer transparent clock. Ingress time determination unit 42 generally determines a time at which a time synchronization protocol packet, such as a PTP packet, is received by optical line terminal 32 from a device external to PON 20. In particular, when a time synchronization protocol packet is received by OLT 32, ingress time determination unit 42 retrieves the current time from local clock 34. Ingress time determination unit 42 communicates this time to correction field update unit 54 over the logical link represented by the dashed line between ingress time determination unit 42 and correction field update unit 54, which again in reality corresponds to the physical optical fiber cable coupling optical interface 40 to optical interface 50.

In some examples, ingress time determination unit 42 communicates the time at which a time synchronization protocol packet is received using out-of-band messages sent to correction field update unit 54. In other examples, ingress time determination unit 42 communicates the time at which a time synchronization protocol packet is received using a temporary field, such as a temporary packet header, that is appended to the time synchronization protocol packet. Optical interface 40 forwards the time synchronization protocol packet to ONU 44 via optical interface 50. ONU 44 may also include an ingress time determination unit and OLT 32 may include a correction field update unit for upstream packets, in some examples.

Correction field update unit 54 is configured with data that describes how long it takes to output a time synchronization protocol packet, e.g., to perform a CRC calculation and to encode the packet with a residence time value. After optical network unit 44 receives a time synchronization protocol packet from OLT 32, and just before ONU 44 is ready to output the packet to a client device external to PON 30, correction field update unit 54 may retrieve the current time from local clock 48. Correction field update unit 54 may adjust the current time by an amount corresponding to the configured time required to output a time synchronization protocol packet (e.g., the time to recalculate CRC data). Correction field update unit 54 may then calculate a residence time of the packet within PON 30. The residence time may correspond to ingress of a packet within PON 30 to egress of the packet from PON 30, e.g., from receipt of the packet by network interface 38 to output of the packet by network interface 52. In particular, correction field update unit 54 may calculate the difference between the adjusted current time and the time at which the packet was received by OLT 32 according to local clock 48. Correction field update unit 54 may then encode the residence time into the packet. For example, for PTP packets, correction field update unit 54 may encode a time stamp correction field of the packet with a value indicative of the residence time. ONU 44 may then recalculate a CRC field of the packet and forward the packet to a client device, such as client device 16.

Although illustrated as OLT 32 having ingress time determination unit 42 and ONU having correction field update unit 54, it should be understood that in some examples, each of OLT 32 and ONU 44 may include both an ingress time determination unit and a correction field update unit 54. In this manner, ONU 44 may receive a time synchronization protocol packet from a client device and determine the time at which the packet was received, and OLT 32 may calculate residence time of the packet in the upstream direction, that is, from ONU 44 to OLT 32.

In some examples, OLT 32 may further determine propagation delay from an upstream device coupled to network interface 38, e.g., a network router, a gateway, a security device, a switch, or other network device that may be coupled to OLT 32. In such examples, PON 30 may be configured as a peer-to-peer transparent clock, rather than as an end-to-end transparent clock. Moreover, assuming that each device is configured to act as a peer-to-peer transparent clock along a path from a source device to a destination device having a clock to be synchronized to the source device, the destination device may synchronize the clock immediately upon receiving a time synchronization protocol packet, because the devices will have accounted for propagation delay in a single packet trip.

Figure 3A:
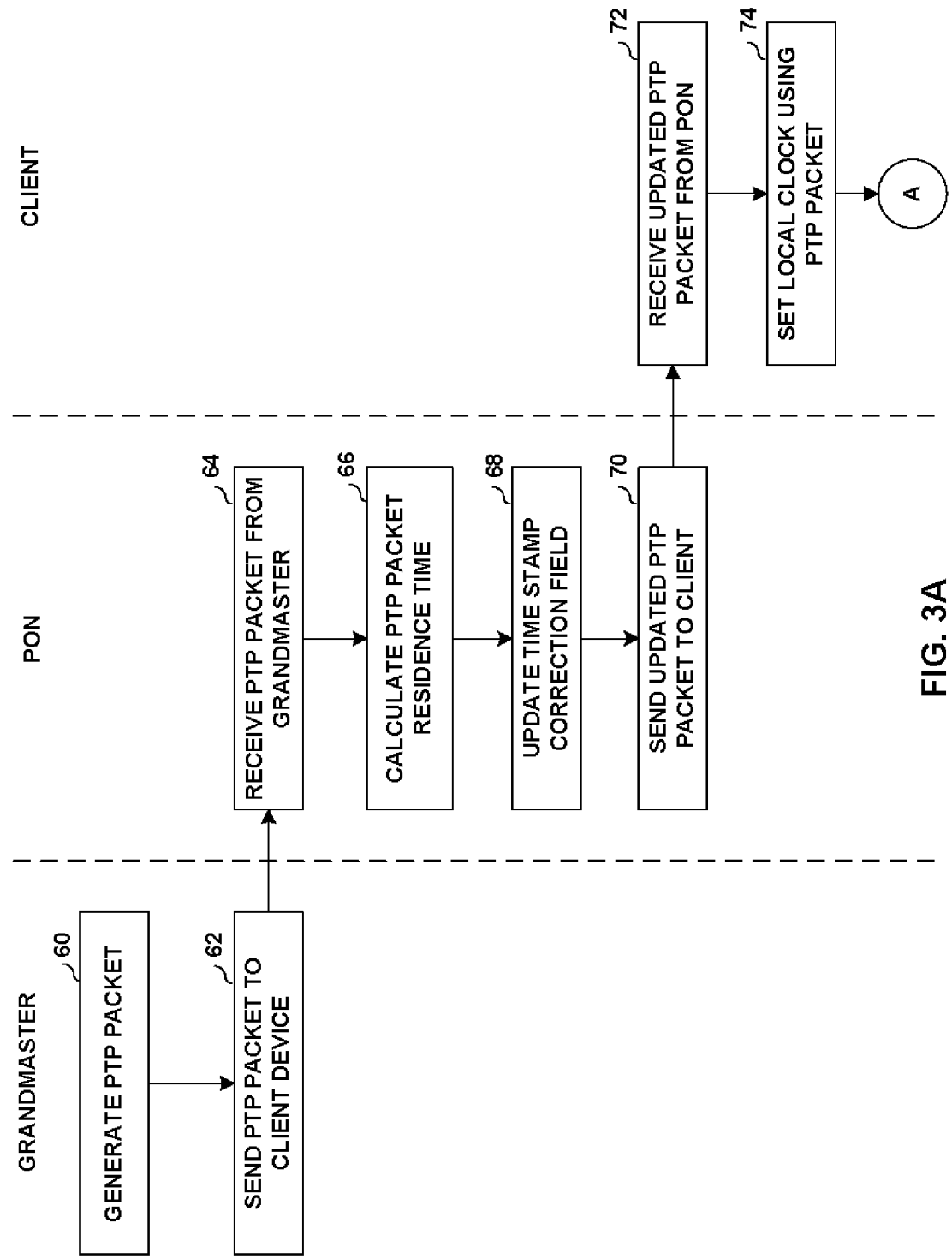
FIGS. 3A-3C are flowcharts illustrating an example method in which devices of a PON cause the PON to participate in the synchronization of a clock of a client device to a grandmaster clock as an end-to-end transparent clock.
Figure 3B:
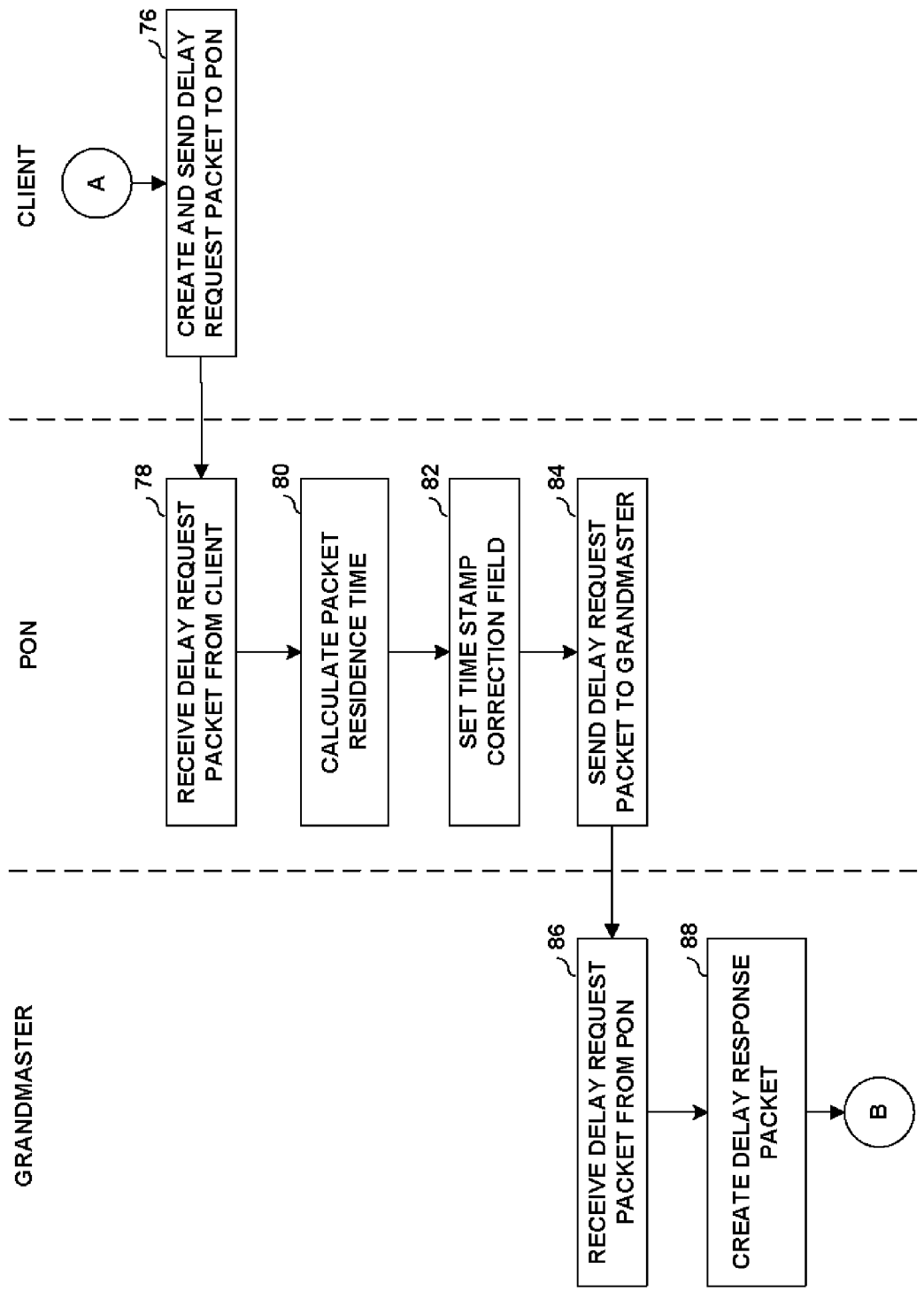
Figure 3C:
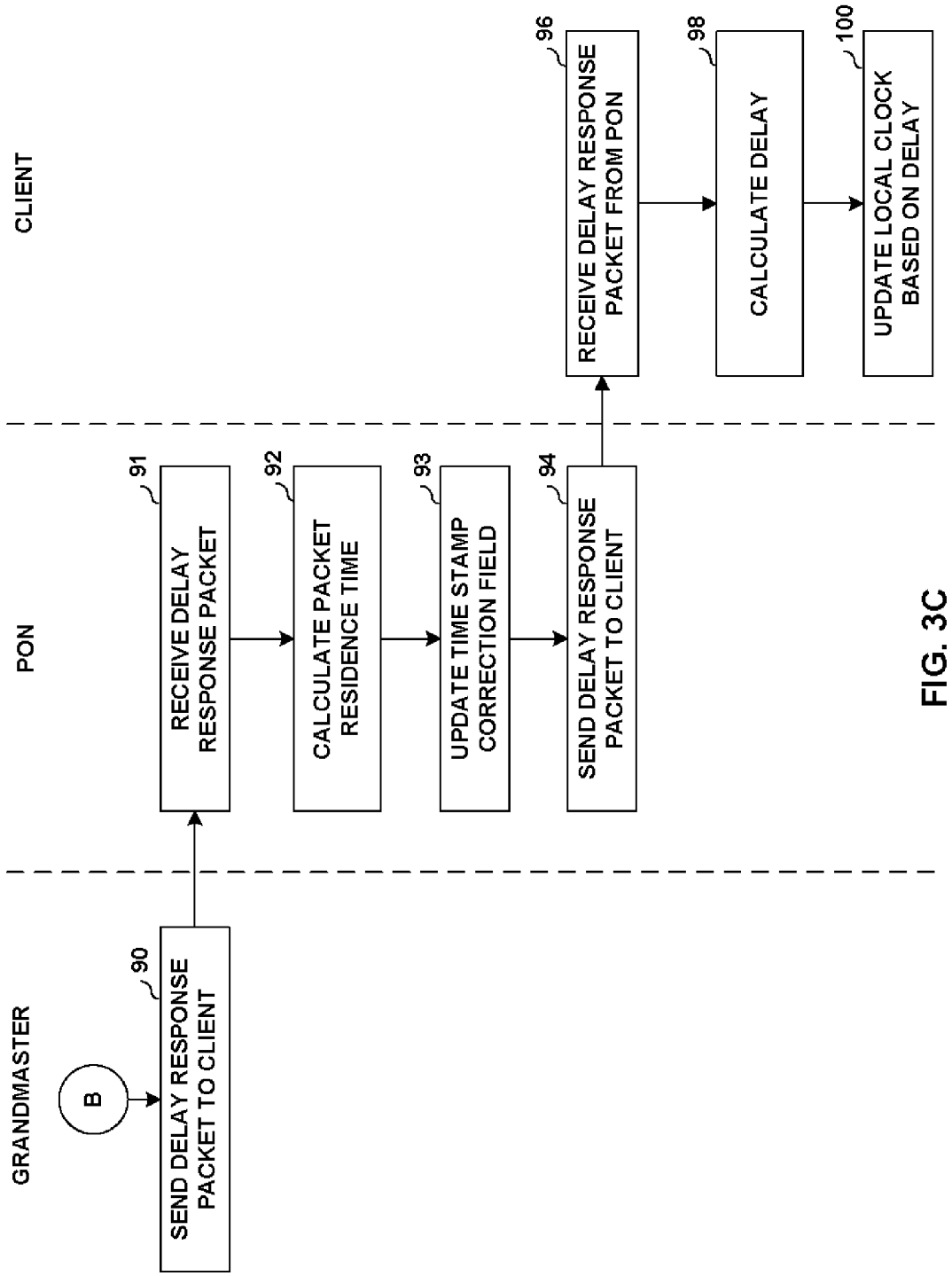
Figure 5:
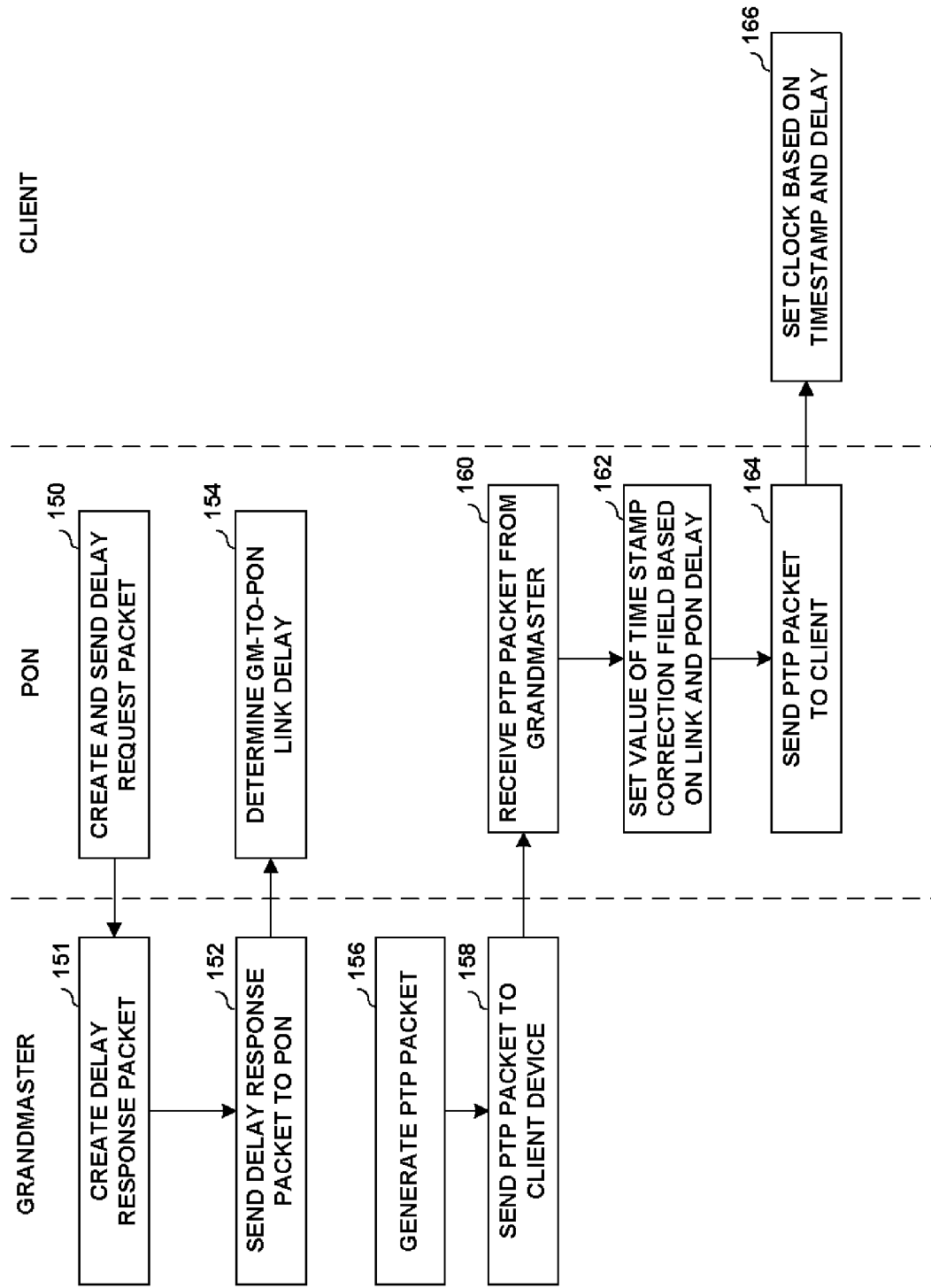
FIG. 5 is a flowchart illustrating an example method in which devices of a PON participates in the synchronization of a clock of a client device to a grandmaster clock as a peer-to-peer transparent clock.

FIGS. 3A-3C ("FIG. 3") are flowcharts illustrating an example method in which devices within a PON participate in the synchronization of a clock of a client device to a grandmaster clock. The method of FIG. 3 is generally applicable to any arrangement of devices in which an intermediate network includes characteristics resembling a PON, e.g., variable and asymmetric delay of the intermediate network, and where the intermediate network implements a transparent clock. The method of FIGS. 3A-3C is described for purposes of example with respect to the elements of FIG. 2, although it should be understood that other network elements may also perform the method of FIGS. 3A-3C. The example method of FIGS. 3A-3C assumes that PON 30 is configured as an end-to-end transparent clock. FIG. 5, discussed in detail below, provides an example in which PON 30 is configured as a peer-to-peer transparent clock.

Initially, in the example of FIG. 3A, grandmaster clock 14 generates a PTP packet (60). In other examples, grandmaster clock 14 may generate any time synchronization protocol packet. The PTP packet generally includes a time stamp value indicative of the time of the grandmaster clock when the packet was generated. The grandmaster clock then forwards the packet to a client device via PON 30 (62).

After receiving the packet from the grandmaster clock (64), the PON calculates the residence time of the packet (66). In particular, at step 66, PON 30 (e.g., correction field update unit 54 of ONU 44 of PON 30) calculates the downstream residence time, i.e., the time corresponding to how long it takes for the packet to flow from OLT 32 and to be output by ONU 44. The residence time is a reflection of the entire time the packet spends within PON 30, i.e., from when the packet first enters network interface 38 to the time the packet exits network interface 52. PON 30 updates a time stamp correction field of the packet to reflect the residence time (68) and forwards the packet to the client device (70).

When the client device receives the packet (72), the client device sets its local clock based on the value of the time stamp correction field and the timestamp (74). In particular, the client device may set its local clock equal to the value of the timestamp plus the value of the time stamp correction field set by components of PON 20. In this manner, the local clock of the client device may take account of the delay caused by PON 20 in the downstream direction. However, the client device may further improve the synchronization of its local clock with the grandmaster clock by accounting for delay caused by devices external to PON 20. To do so, the client device may formulate a delay request packet that includes the value of the client device's local clock and send the delay request packet to the grandmaster device (FIG. 3B, 76).

PON 30 may subsequently receive the packet from the client device (78) and then calculate upstream residence time (80). With respect to the example of FIG. 2, the upstream residence time corresponds to the time it takes for the packet to flow from ONU 44 and to be output by OLT 32. PON 30 sets the value of the time stamp correction field of the packet (82) based on the upstream residence time and forwards the packet to the grandmaster clock (84).

After the grandmaster clock receives the packet from PON 30 (86), the grandmaster clock creates a delay response packet, in some examples, by adding a timestamp to the delay request packet (88). In some examples, the grandmaster clock may instead simply forward the packet back to the client device. In the example of FIG. 3C, the grandmaster clock sends a delay response packet to the client that includes a current timestamp from the grandmaster via PON 30 (90).

PON 30 may subsequently receive the delay response packet (91) and again calculate residence time for the packet (92). In a manner similar to the treatment of the original PTP packet, PON 30 may update the value of the time stamp correction field of the packet (93) and send the packet to the client device (94). At this point, the value of the time stamp correction field corresponds to the total round trip delay introduced by PON 30. That is, the value of the time stamp correction field is updated in step (93) to add the downstream residence time to the time stamp correction field, which previously included the value of the upstream residence time (as set per step 82 in FIG. 3B).

When the client ultimately receives the packet (96), the client may calculate a delay reflective of symmetric delay (98). That is, the client may use the original PTP packet to set its local clock based on the delay introduced by PON 30, which generally comprises asymmetric delay. To calculate the symmetric delay, the client may determine the total round trip delay (RTD, also referred to as round trip time or RTT), by calculating the difference between the time at which the delay response packet was received and the time at which the client device sent the corresponding delay request packet, and then subtracting from this difference the value of the time stamp correction field and dividing by two. The client may then use this delay to synchronize its local clock to the grandmaster clock (100). For example, the client may add the delay value to the current value of its local clock to synchronize its local clock with the grandmaster.

By setting the value of the local clock according to the method of FIGS. 3A-3C, the client device may synchronize its clock to the grandmaster clock with high precision, which may cause the local clock to be aligned in frequency and phase with the grandmaster clock. Moreover, a plurality of client devices may each perform this method such that clocks of each of the client devices are aligned in frequency and phase. The plurality of client devices may be coupled to various ONUs of PON 30, and not necessarily the same ONU. The residence time of PTP packets, in such examples, may therefore correspond to the amount of time the packet spends within PON 30, that is, the time from when the packet arrives at the OLT to the time the packet leaves the respective ONU for downstream residence time, or the time from when the packet arrives at the respective ONU to the time the packet leaves the OLT for upstream residence time.

Figure 4:
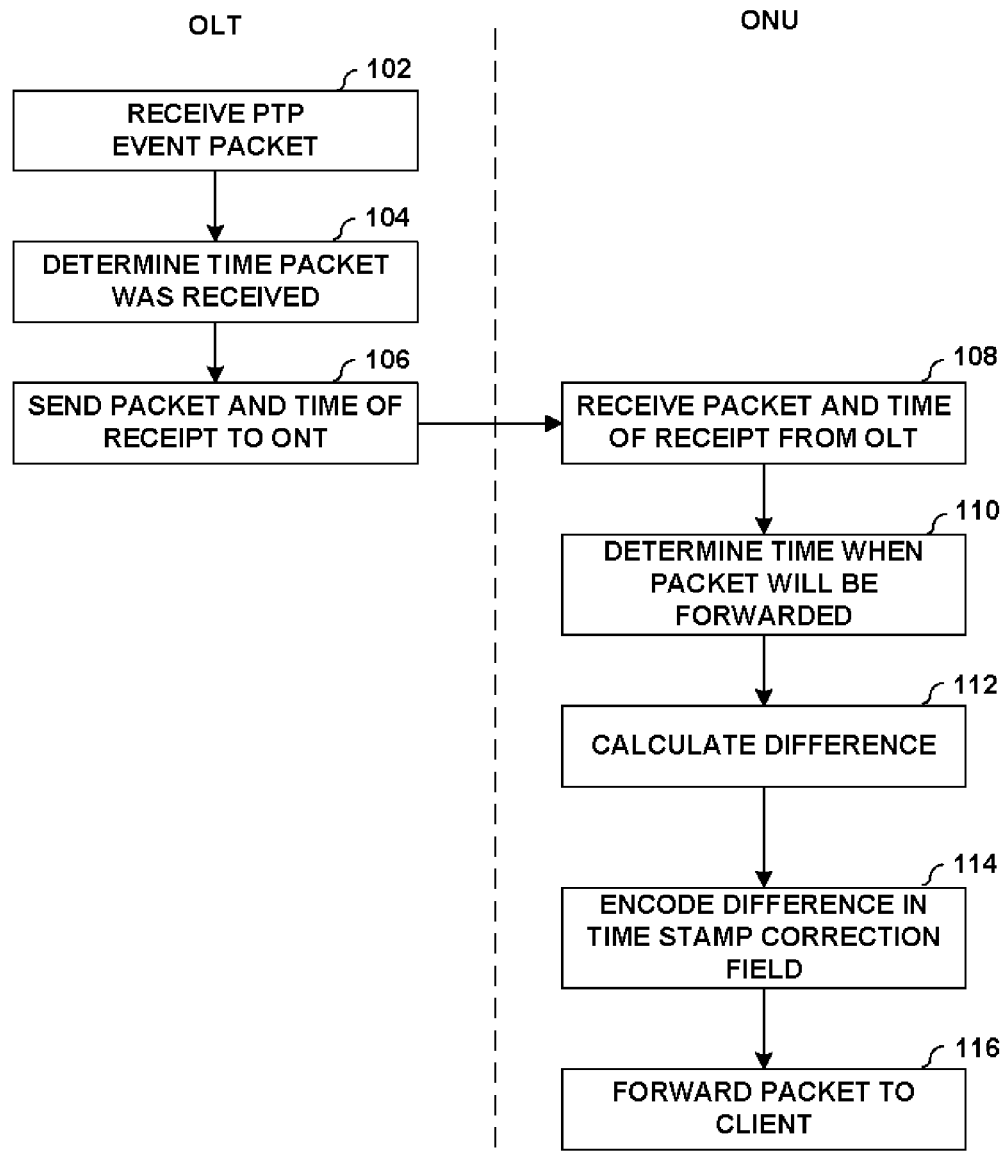
FIG. 4 is a flowchart illustrating a method performed by an optical line terminal (OLT) and an optical network unit (ONU) during the steps attributed to the PON in FIG. 3A.

FIG. 4 is a flowchart illustrating a method performed by OLT 32 and ONU 44 during the steps attributed to PON 30 in FIG. 3A, that is, steps 64-70 of FIG. 3A. Although the method of FIG. 4 is described in the downstream direction, it should be understood that similar steps may be executed by reversing the roles of OLT 32 and ONU 44 in the upstream direction. In the example of FIG. 4, OLT 32 receives a PTP event packet (102), such as a PTP sync or delay_request packet. Of course, the method of FIG. 4 may also apply to other time synchronization protocol packets, such as NTP packets.

In response to receiving a PTP event packet, ingress time determination unit 42 retrieves the current time from local clock 34 to determine a time at which the packet was received (104). OLT 32 then sends the packet and the time of receipt to ONU 44 (106). In some examples, OLT 32 communicates the time of receipt to ONU 44 in an out-of-band communication, while in other examples, OLT 32 appends a header or other field comprising the receipt time to the packet itself.

After receiving the packet from OLT 32 (108), ONU 44 determines a time when the packet will be forwarded (110). This determination is based on a current time indicated by local clock 48, as well as a prediction of how long it will take to output the packet, recalculate CRC data, update hash values used to authenticate packet contents, or any other pre-forwarding packet processing required. Correction field update unit 54 then calculates the difference between the time at which the packet will be forwarded and the time at which the packet was received by OLT 32 (112) and encodes the difference in the time stamp correction field of the packet (114). ONU 44 then forwards the packet to the client, where forwarding of the packet includes performing any pre-forwarding processing, such as recalculating CRCs and updating hash values (116).

FIG. 5 is a flowchart illustrating an example method in which devices of a PON participate in the synchronization of a clock of a client device to a grandmaster clock as a peer-to-peer transparent clock. In the example method of FIG. 5, PON 30 (that is, OLT 32 of PON 30) may initially determine the delay associated with the link between grandmaster clock 14 and PON 30, with respect to the example of FIG. 1. In the example of FIG. 5, the client device may synchronize its local clock with the grandmaster clock without the use of a delay request packet, as OLT 32 and ONU 44 of PON 30 may account for both delay of PON 30 as well as the delay between PON 30 and grandmaster clock 14.

Initially, to determine the delay associated with the link between PON 30 and grandmaster clock 14, PON 30 (e.g., OLT 32 of PON 30) generates a delay request packet and sends the delay request packet to grandmaster clock 14 (150). In this manner, PON 30 acts as a client of grandmaster clock 14. In response to the delay request, grandmaster clock 14 creates a delay response packet (151) and sends the delay response to PON 30 (152), which may be received by OLT 32 of PON 30. Upon receiving the delay response packet, PON 30 (e.g., OLT 32) may determine the delay associated with the link between itself and grandmaster clock 14, i.e., the GM-to-PON link delay (154). For example, PON 30 may divide the round trip time of the delay request packet by two to calculate the delay associated with the link.

At some point thereafter, grandmaster clock 14 may generate a PTP packet to cause the client device to synchronize to grandmaster clock 14 (156). Grandmaster clock 14 may include a timestamp of the current time of grandmaster clock 14 in the PTP packet. Grandmaster clock 14 may then send the PTP packet to the client device via PON 30 (158).

PON 30, upon receiving the PTP packet (160), may set the value of a time stamp correction field of the PTP packet according to the downstream residence time of the PTP packet (that is, the difference between the time network interface 38 receives the packet to the time network interface 52 outputs the packet), which may account for the previously determined delay associated with the link between PON 30 and grandmaster clock 14 (162). PON 30 may then send the PTP packet to the client device (164). For example, ONU 44 may set the value of the time stamp correction field and forward the packet to the client device.

In some examples, PON 30 also determines the delay associated with the link between PON 30 and the client device, while in other examples, the client device determines the delay associated with the link between itself and PON 30 (e.g., ONU 44 of PON 30). In either case, when the PTP packet arrives at the client device, the client device has all of the information required to synchronize its local clock with that of grandmaster clock 14. Accordingly, the client device sets its clock (166) based on the value of the time stamp, the value of the time stamp correction field (which reflects at least the delay associated with the link between PON 30 and grandmaster clock 14) and the delay associated with the link between PON 30 and the client device (which may also be reflected by the time stamp correction field, or may be a value that is predetermined by the client device).

Figure 6A:
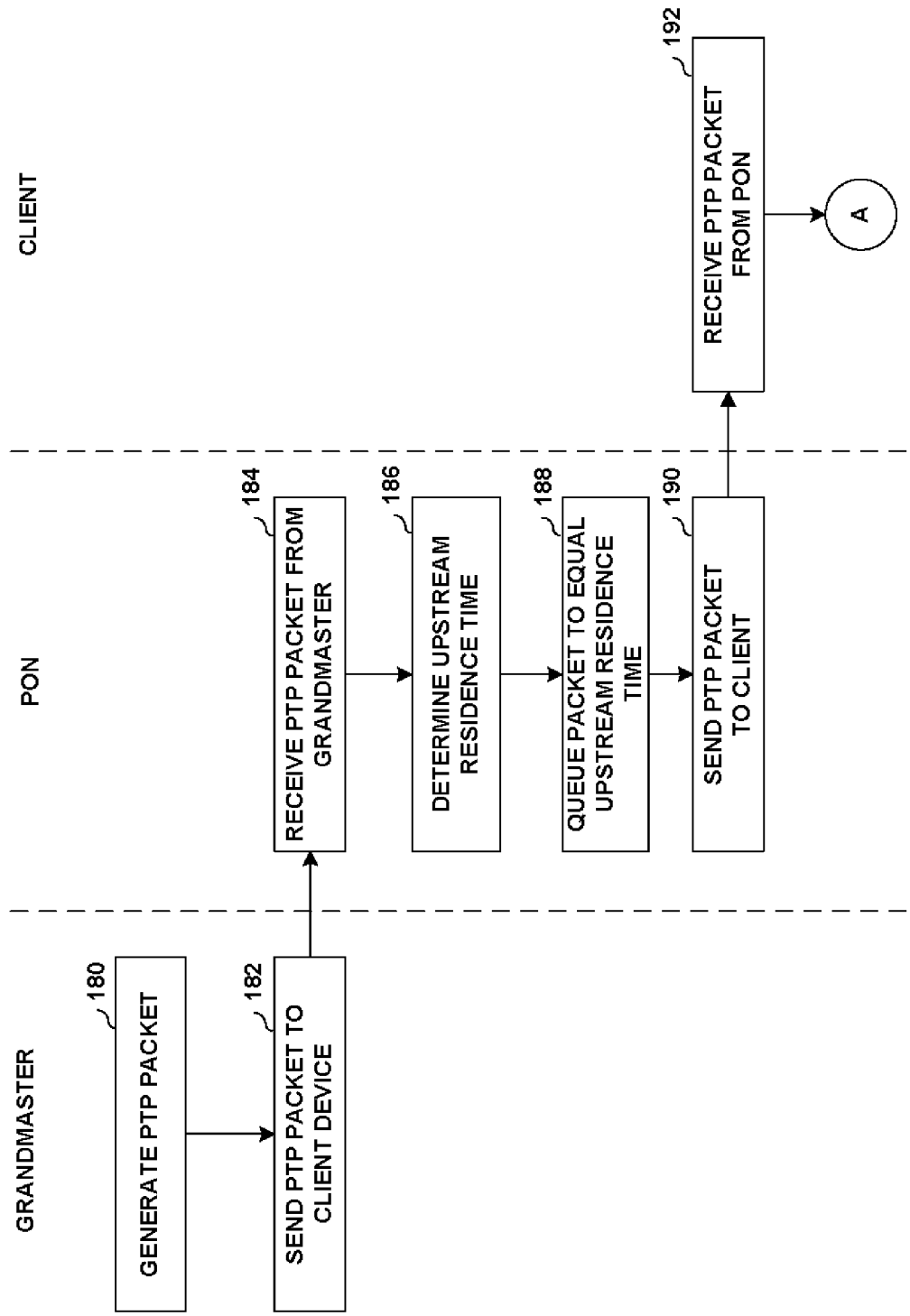
FIGS. 6A and 6B are flowcharts illustrating another example method in which a PON participates in a time synchronization protocol session between a grandmaster clock and a client device.
Figure 6B:
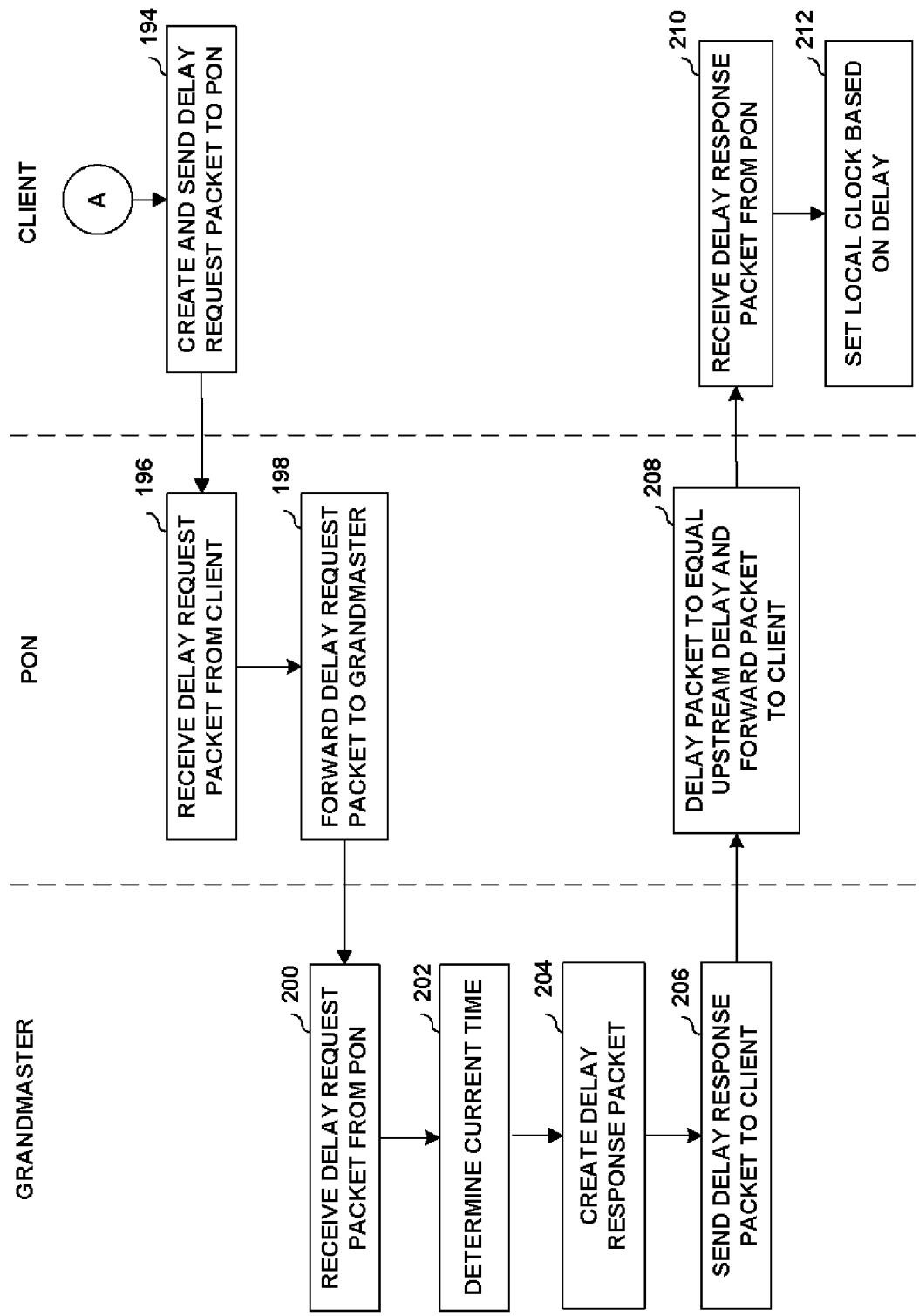

FIGS. 6A and 6B ("FIG. 6") are flowcharts illustrating another example method in which a PON participates in a time synchronization protocol session between a grandmaster clock and a client device. The example of FIGS. 6A and 6B is described with respect to the components of FIG. 1 for purposes of explanation. It should be understood that other PON systems or other communication networks generally having asymmetric delay in the downstream and upstream directions may utilize similar methods. The method of FIGS. 6A and 6B generally includes PON 20 queuing a time synchronization protocol packet in the downstream direction for a time that causes the downstream delay to approximately equal predicted upstream delay. As a preliminary matter, it is assumed that, through empirical testing, PON 20 is configured with sufficient data to estimate the upstream delay.

Initially, grandmaster clock 14 generates a PTP packet, in this example (180). Grandmaster clock 14 sends the packet to client device 16 via PON 20 (182). PON 20 receives the PTP packet from grandmaster clock 14 (184) and determines upstream residence time (186). Prior to forwarding the packet, PON 20 determines the residence time in the downstream direction and queues the packet for a period of time such that the total residence time in the downstream direction approximately equals the predicted residence time in the upstream direction (188). In some cases, the upstream delay may be estimated or predicted, such that the delay introduced in the downstream direction causes PTP packets in the downstream direction to have a residence time within PON 20 that approximately equals the predicted residence time in the upstream direction. PON 20 then forwards the packet to client device 16 (190). In some examples, as described above, PON 20 may be configured to introduce delay both in the downstream and upstream directions, such that all PTP packets in either direction have a common residence time within PON 20.

Client device 16 then receives the PTP packet from PON 20 (192) and, in accordance with PTP (in this example) creates a delay request packet and sends the delay request packet back to grandmaster clock 14 (194). Accordingly, PON 20 receives the packet (196) and forwards the packet to grandmaster clock 14 (198). Grandmaster clock 14 then receives the packet from PON 20 (200), determines the current time (202), and generates a delay response packet using the delay request packet, which includes the current time as a timestamp (204).

Grandmaster clock 14 may then send the delay response to client device 16 (206). PON 20 receives the packet, queues the packet for a period of time to match the upstream delay, and then forwards the packet to client device 16 (208). Upon receiving the message (210), client device 16 calculates the delay between grandmaster clock 14 and client device 16 as one-half of the round trip time, and uses the offset value to set the local clock of client device 16 (212). In this manner, PON 30 creates, for PTP packets, an artificial synchronicity between upstream and downstream delays, thus causing the standard configuration of client device 16 to properly determine how to synchronize with grandmaster clock 14.

In general, it is expected that the upstream residence time of PON 20 will exceed the downstream residence time, because ONU 24 is limited as to the times at which ONU 24 may forward traffic to OLT 22, which may be subject to upstream bandwidth allocation in contention with other ONUs. Accordingly, the techniques of this disclosure, with respect to the example of FIGS. 6A and 6B, may introduce delay on the downstream side to approximately equal the residence time of the upstream side. In some examples, all PTP packets may have a common residence time within PON 20, in that OLT 22 and/or ONU 24 may cause all PTP packets to reside within PON 20 for a predetermined amount of time. Thus, in some examples, OLT 22 and/or ONU 24 may introduce delay into both upstream and downstream PTP packets to cause the PTP packets in both directions to reside within PON 20 for the predetermined amount of time. The client device may set the time of its local clock when the PTP packet is received in order to later update the local clock.

By setting the value of the local clock according to this method, client device 16 may synchronize its clock to grandmaster clock 14 with high precision, which may cause the local clock to be aligned in frequency and phase with the grandmaster clock. Moreover, a plurality of client devices may each perform this method such that clocks of each of the client devices are aligned in frequency and phase.

Figure 7A:
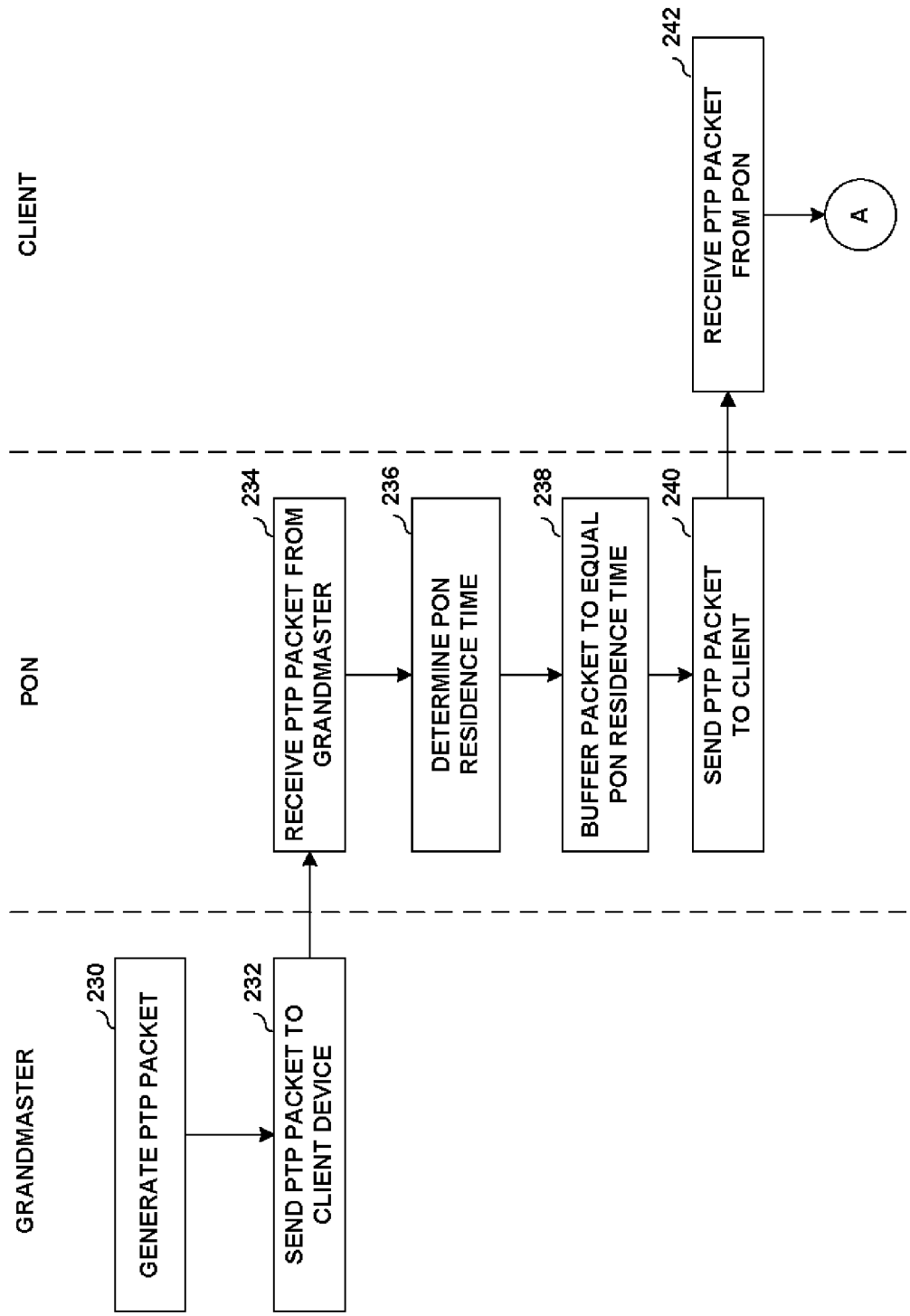
FIGS. 7A and 7B are flowcharts illustrating another example method in which a PON participates in a time synchronization protocol session between a grandmaster clock and a client device.
Figure 7B:
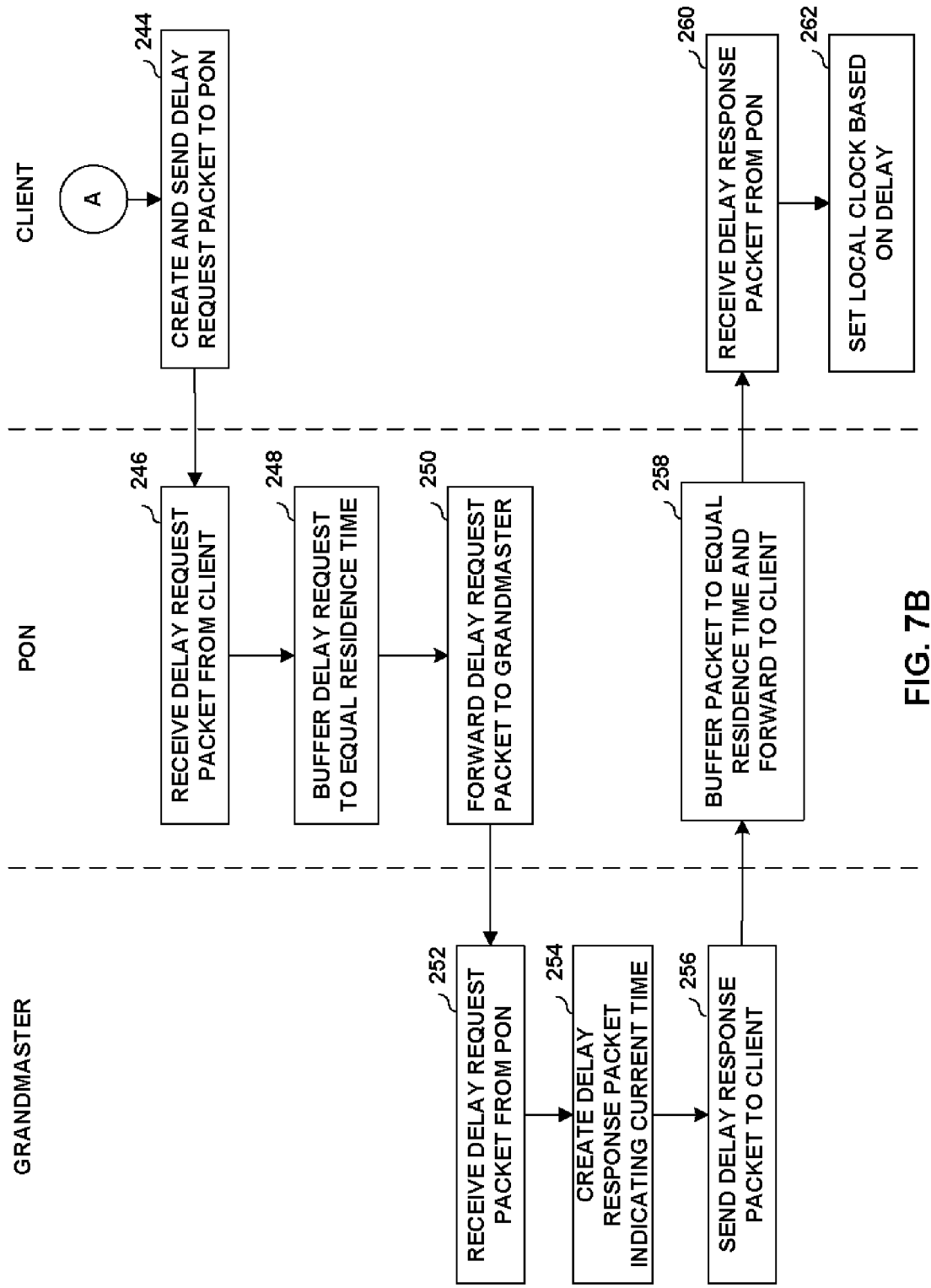

FIGS. 7A and 7B (FIG. 7) are flowcharts illustrating another example method in which a PON, e.g., PON 20 of FIG. 1, participates in a time synchronization protocol session between a grandmaster clock and a client device. The example of FIGS. 7A and 7B is described with respect to the components of FIG. 1 for purposes of explanation. It should be understood that other PON systems or other communication networks generally having asymmetric delay in the downstream and upstream directions may utilize similar methods. The method of FIGS. 7A and 7B generally includes delaying PTP packets in either the upstream direction, the downstream direction, or both, such that PTP packets spend the same amount of time within PON 20 in both the downstream and the upstream direction.

Initially, grandmaster clock 14 generates a PTP packet, in this example (230). Grandmaster clock 14 sends the packet to client device 16 via PON 20 (232). PON 20 receives the PTP packet from grandmaster clock 14 (234) and determines a PON residence time (236). That is, PON 20 (e.g., either an OLT or an ONU of PON 20) determines a total amount of time that a PTP packet is to be present within PON 20. Prior to forwarding the packet, PON 20 determines the residence time in the downstream direction and queues the packet for a period of time such that the total residence time in the downstream direction approximately equals the predetermined residence time (238). Rather than predicting an upstream residence time in this example, PON 20 ensures that all PTP packets in the downstream direction and in the upstream direction are resident within PON 20 for the same amount of time, namely the determined residence time. PON 20 then forwards the packet to client device 16 (240). In this manner, PON 20 may introduce delay both in the downstream and upstream directions, such that all PTP packets in both directions have a common residency time within PON 20.

Client device 16 then receives the PTP packet from PON 20 (242) and, in accordance with PTP (in this example) creates a delay request packet and sends the delay request packet back to grandmaster clock 14 (244). In some examples, client device 16 may receive the PTP packet from ONU 24. Accordingly, PON 20 receives the packet (246). PON 20 then buffers the packet for a period of time to cause the packet to reside within PON 20 for the determined residence time (248). In particular, either or both of OLT 22 and/or ONU 24 may include memory to buffer the packet. PON 20 then forwards the packet to grandmaster clock 14 (250). For example, OLT 22 of PON 20 may forward the packet to grandmaster clock 14.

Next, grandmaster clock 14 may receive the packet from PON 20 (252), then generates a delay response packet includes the current time as a timestamp in response to the delay request packet (254). Grandmaster clock 14 may then send the delay response to client device 16 (256). PON 20 may receive the packet, buffer the packet for a period of time to match the predetermined residence time, and then forward the packet to client device 16 (258). Again, either or both of OLT 22 and/or ONU 24 may include memory for buffering the packet for the predetermined time period. For example, OLT 22 may receive the packet from grandmaster clock 14 and forward the packet to ONU 24, which may buffer the packet such that the packet has a predetermined residence time within PON 20. ONU 24 may then forward the packet to client device 16. In other examples, OLT 22 may buffer the packet for a first portion of the predetermined residence time, then forward the packet to ONU 24, which may buffer the packet for a second portion of the predetermined residence time. In still other examples, only OLT 22 may buffer the packet, then forward the packet to ONU 24, which may immediately forward the packet to client device 16.

Upon receiving the packet (260), client device 16 calculates the delay between grandmaster clock 14 and client device 16 as one-half of the round trip time, and uses the offset value to set the local clock of client device 16 (262). In this manner, PON 20 may create, for PTP packets, an artificial synchronicity between upstream and downstream delays, thus causing the standard configuration of client device 16 to properly determine how to synchronize a local clock of client device 16 with the time indicated by grandmaster clock 14, in accordance with PTP.

In accordance with the examples of FIGS. 7A and 7B, all PTP packets may have a common residency time within PON 20, in that OLT 22 and/or ONU 24 may cause all PTP packets to reside within PON 20 for a predetermined amount of time. Thus, OLT 22 and/or ONU 24 may introduce delay into either or both upstream and downstream PTP packets to cause the PTP packets in both directions to reside within PON 20 for the predetermined amount of time. The client device may set the time of its local clock when the PTP packet is received in order to later update the local clock, determining a time offset based on one-half of the round trip time.

By setting the value of the local clock according to this method, client device 16 may synchronize its clock to grandmaster clock 14 with high precision, which may cause the local clock to be aligned in frequency and phase with the grandmaster clock. Moreover, a plurality of client devices may each perform this method such that clocks of each of the client devices are aligned in frequency and phase.

Figure 8:
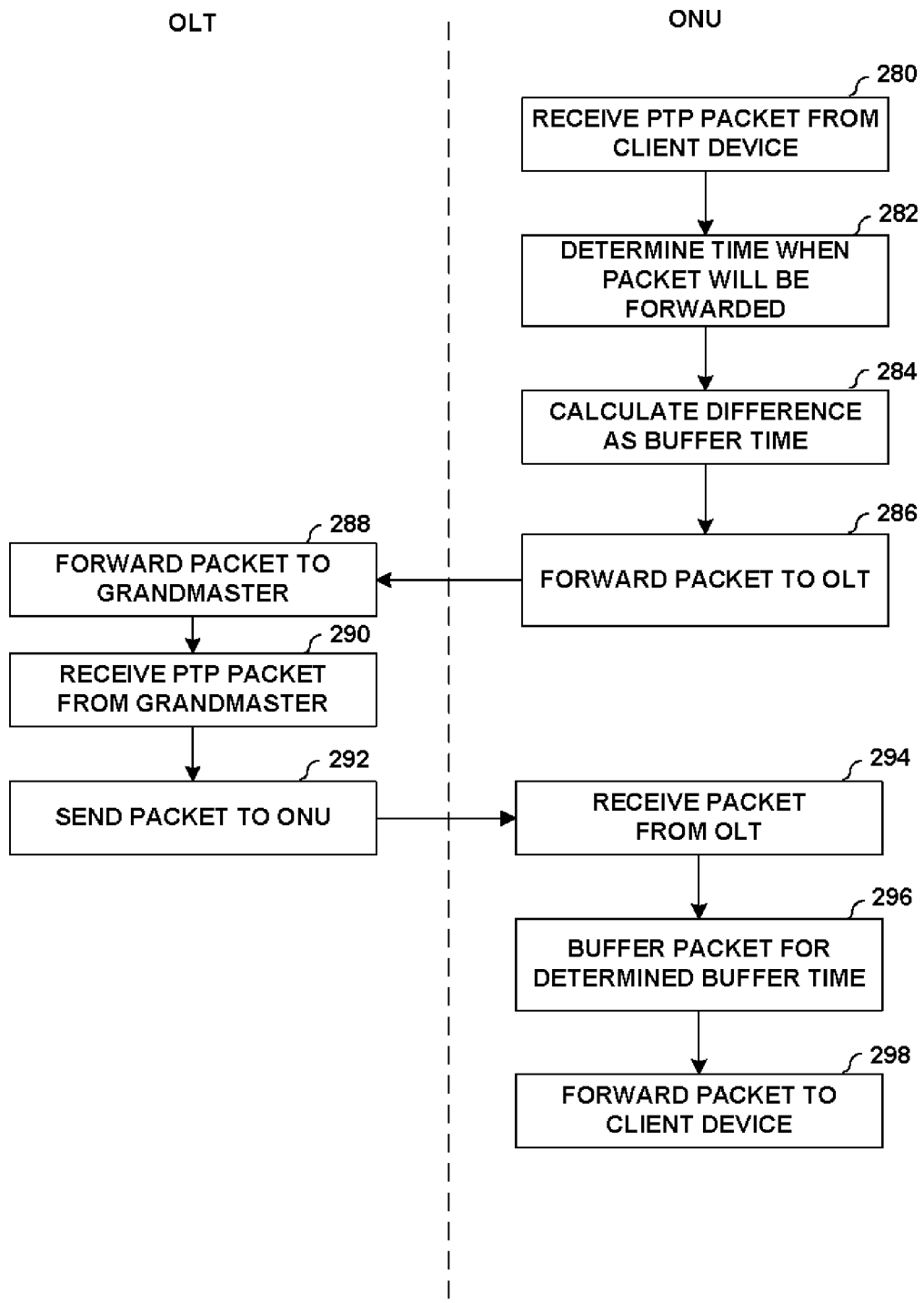
FIG. 8 is a flowchart illustrating an example method for introducing delay to PTP packets to cause upstream and downstream PTP packets to have approximately equal residence time in a PON.

FIG. 8 is a flowchart illustrating an example method for introducing delay to PTP packets to cause upstream and downstream PTP packets to have approximately equal residence time in PON 20. Although described with respect to the elements of FIG. 1 for purposes of example, it should be understood that other PON systems or other networks having asymmetric delay in the downstream vs. upstream directions may utilize the techniques of FIG. 8.

The techniques of FIG. 8 generally include calculating a residence time for packets in the upstream and downstream directions. The residence time, in this example, may be based on the difference between the time at which the ONU receives a PTP packet and a time at which the ONU is permitted to transmit data to the OLT, e.g., as indicated by a MAP message from the OLT, allocating an upstream bandwidth grant to the ONU. The MAP message generally indicates when the ONU is permitted to transmit data upstream to the OLT. Thus, the residence time for PTP packets may be based on the difference between a time at which the ONU receives an upstream PTP packet and the time at which the ONU is permitted to transmit the received upstream PTP packet to the OLT.

Initially, ONU 24 may receive a PTP packet from client device 16 (280). ONU 24 may then determine a time when the packet may be forwarded to OLT 22, e.g., based on timing information provided by OLT 22 in a MAP message (282). ONU 24 may calculate the difference between these two times as a buffer time (284). ONU 24 may then forward the packet to OLT 22 at the time indicated in the MAP message (286). In some examples, ONU 24 may prioritize the packet, e.g., by ensuring that the packet is placed at the front of the message sent to OLT 22.

OLT 22 may then receive the packet and forward the packet to grandmaster clock 14 (288). Following this, OLT 22 may receive a PTP packet from grandmaster clock 14 (290). OLT 22 may then forward the packet to ONU 24 (292). ONU 24 may receive the packet from OLT 22 (294), and then buffer the packet for the buffer time determined at step 284 (296). Once the packet has been buffered for this determined buffer time, ONU 24 may forward the packet to client device 16 (298). In this manner, PTP packets both in the upstream and the downstream direction may remain in PON 20 for approximately equal amounts of time. If ONU 24 receives an upstream PTP packet before receiving the downstream PTP packet from OLT 22, ONU 24 may discard the upstream PTP packet. Moreover, ONU 24 may apply the same buffer time to all downstream PTP packets received prior to receiving another upstream PTP packet.

In some examples, rather than determining the buffer time based on a single, most recently received upstream PTP packet, ONU 24 may calculate an average upstream delay. The average upstream delay may be the average of the delays of a number of previously received upstream PTP packets. In some examples, ONU 24 may calculate the average using a formula approximating an infinite impulse response filter that weights the delays of the most recently received upstream PTP packets more heavily than delays for relatively less recent upstream PTP packets.

Figure 9:
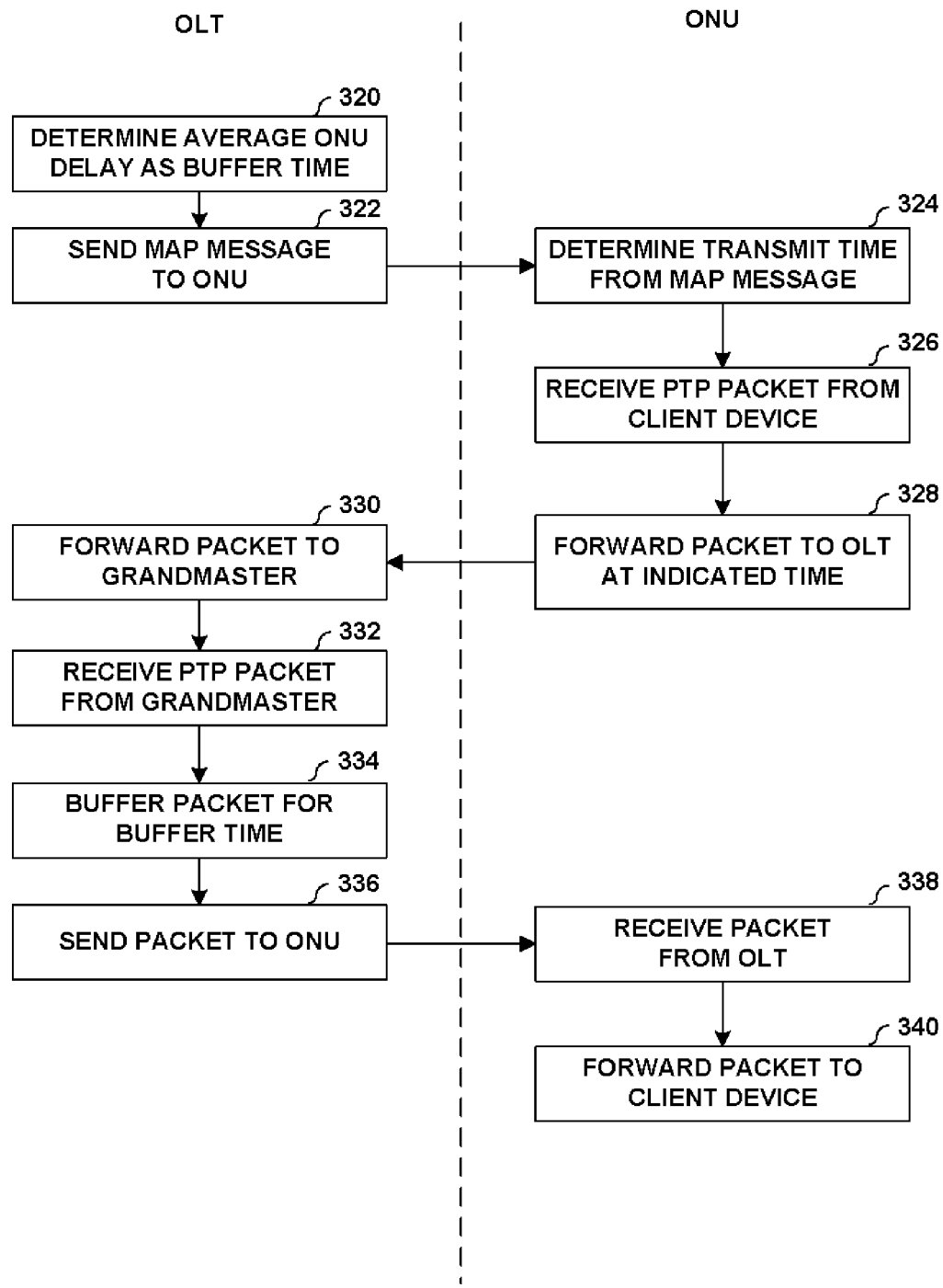
FIG. 9 is a flowchart illustrating another example method for introducing delay to PTP packets to cause upstream and downstream PTP packets to have approximately equal residence time in a PON.

FIG. 9 is a flowchart illustrating another example method for introducing delay to PTP packets to cause upstream and downstream PTP packets to have approximately equal residence time in PON 20. Although described with respect to the elements of FIG. 1 for purposes of example, it should be understood that other PON systems or other networks having asymmetric delay in the downstream vs. upstream directions may utilize the techniques of FIG. 9. In this example, OLT 22 determines a buffer time based on an average amount of time ONU 24 spends waiting to transmit. For example, OLT 22 may first determine an average ONU delay as a buffer time (320). That is, OLT 22 may determine an average amount of time ONU 24 spends waiting to transmit data to OLT 22, then use this determined average waiting time as a buffer time for a downstream packet PTP packet.

OLT 22 may send a MAP message to ONU 24 (322), informing ONU 24 of a time at which ONU 24 may transmit data to OLT 22. Accordingly, ONU 24 may determine a transmit time from the MAP message (324). ONU 24 may then receive a PTP packet from client device 16 (326). It should be understood that, in some examples, ONU 24 may receive the PTP packet before receiving the MAP message. In any case, ONU 24 forwards the packet to OLT 22 at the time indicated by the MAP message (328). In some examples, ONU 24 may prioritize the packet by placing the packet at the front of a traffic container (T-CONT) sent to OLT 22 at the time indicated in the MAP message.

OLT 22 may forward the PTP packet to grandmaster clock 14 after receiving the PTP packet from ONU 24 (330). OLT 22 may then receive a PTP packet from grandmaster clock 14 (332). Rather than immediately forwarding the PTP packet to ONU 24, OLT 22 may buffer the PTP packet from grandmaster clock 14 for the previously determined buffer time (334), that is, the average time ONU 24 spends waiting to transmit to OLT 22. OLT 22 may then send the packet to ONU 24 (336). ONU 24 may then receive the packet from OLT 22 (338) and forward the packet to client device 16 (340).

Although described for purposes of example with respect to passive optical networks, the techniques of this disclosure may be applied in other contexts as well. These techniques may generally be implemented in network systems that have asymmetric delay between downstream and upstream network transmissions. For example, the techniques of this disclosure may be implemented in systems corresponding to digital subscriber line (DSL) networks, passive optical networks, wireless networks such as WiMAX networks, data over cable service interface specification (DOCSIS®) networks, or other networks that introduce asymmetric delays between upstream and downstream network transmissions.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. A computer-readable storage medium may comprise a non-transient, tangible medium. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

For purposes of illustration, the techniques of this disclosure are primarily described with respect to passive optical networks (PONs), which may include gigabit PONs (GPONs). However, the techniques of this disclosure are generally applicable to any network having asymmetric delay. That is, as noted above, a PON, for example, has asymmetric delay in the downstream direction (that is, from an OLT to an ONU) relative to the upstream delay (that is, from an ONU to an OLT). Such asymmetric delay in a PON may be caused by a one-to-many relationship between one OLT and a plurality of ONUs connected to the OLT, where the OLT is able to transmit to the ONUs at any time, but the ONUs are limited in terms of the times at which they are permitted to transmit to the OLT, in order to avoid collisions between data transmissions from two or more ONUs attempting to transmit simultaneously. Thus, the time data resides in a PON in the downstream direction (the downstream delay) may differ from the time data resides in the PON in the upstream direction (the upstream delay).

Other networks may also have asymmetric delay. For example, digital subscriber line (DSL) networks, WiMAX networks, and DOCSIS networks generally encounter asymmetric delay between the downstream and upstream directions. The techniques of this disclosure may be applied to these or other networks having asymmetric delay. In general, a network with an asymmetric delay refers to two or more devices, such that the average delay in one direction between two of the devices in the network is less than the average delay in the other direction between the same two devices. The two devices may serve as ingress and egress points to the network, depending on which of the devices receives packets from devices external to the network and which of the devices delivers packets to other devices external to the network. In the example of a PON, the two devices may include an OLT and an ONU.

Various examples have been described. These and other examples are within the scope of the following claims.

The invention claimed is:

1. A method comprising:
   calculating, with a device of a network having asymmetric delay, a downstream residence time of a time synchronization protocol packet within the network;
   adding an indication of the residence time into the packet;
   forwarding the packet to a client device;
   after forwarding the packet to the client device, receiving the packet from the client device;
   calculating an upstream residence time of the packet;
   adding the upstream residence time in the packet;
   forwarding the packet to a grandmaster clock;
   receiving, from the client device, a delay request packet;
   adding an upstream residence time value to a time stamp correction field of the delay request packet;
   forwarding the delay request packet to the grandmaster clock;
   receiving the delay request packet back from the grandmaster clock;
   adding a downstream residence time value to the time stamp correction field of the delay request packet after receiving the delay request packet back from the grandmaster clock; and
   forwarding the delay request packet to the client device to cause the client device to synchronize a local clock of the client device to the grandmaster clock.

2. The method of claim 1, wherein the time synchronization protocol packet comprises a precision time protocol packet.

3. The method of claim 2, wherein adding the residence time into the packet comprises setting a value of a time stamp correction field according to the residence time.

4. The method of claim 1, wherein calculating the residence time comprises:
   determining, with an optical line terminal (OLT) of the network, a time at which the packet was received by the OLT;
   determining, with an optical network unit (ONU) of the network, a time at which the packet will exit the ONU; and
   calculating, as the residence time, the difference between the time at which the packet will exit the ONU and the time at which the packet was received by the OLT.

5. The method of claim 4, further comprising providing, with the OLT, an indication of the time at which the packet was received to the ONU.

6. The method of claim 5, wherein providing the indication comprises appending a temporary field to the packet, wherein the temporary field comprises a value representative of the time at which the packet was received.

7. The method of claim 4, wherein determining the time at which the packet will exit the ONU comprises estimating an amount of time required to process the packet prior to forwarding the packet.

8. The method of claim 4, further comprising recalculating, with the ONU, a cyclical redundancy check (CRC) of the packet based on the residence time.

9. The method of claim 1, further comprising:
   receiving the packet from an upstream network device outside the network;
   calculating a link delay from the upstream network device to the network; and
   wherein adding the residence time further comprises adding the link delay from the upstream network device and the residence time into the packet.

10. A system comprising:
    an optical line terminal (OLT) configured to receive a time synchronization protocol packet from a grandmaster clock, and to calculate a link delay from the grandmaster clock to the system; and
    an optical network unit (ONU) configured to calculate a residence time of the time synchronization protocol packet within a network including the OLT and the ONU, add the residence time into the packet, to forward the packet to a client device, and to add the link delay from the upstream network device, in addition to the residence time, into the packet, wherein the network has asymmetric delay such that a downstream delay from the OLT to the ONU is different than an upstream delay from the ONU to the OLT.

11. The system of claim 10, wherein the time synchronization protocol packet comprises a precision time protocol packet.

12. The system of claim 11, wherein to add the residence time into the packet, the ONU is configured to set a value of a time stamp correction field according to the residence time.

13. The system of claim 10,
wherein the OLT is configured to determine a time at which the packet was received; and
wherein the ONU is configured to a time at which the packet will exit the ONU and to calculate the residence time as the difference between the time at which the packet will exit the ONU and the time at which the packet was received.

14. The system of claim 13, wherein the OLT is configured to provide an indication of the time at which the packet was received to the ONU.

15. The system of claim 14, wherein to provide the indication, the OLT is configured to append a temporary field to the packet, wherein the temporary field comprises a value representative of the time at which the packet was received.

16. The system of claim 13, wherein to determine the time at which the packet will exit the ONU, the ONU is configured to estimate an amount of time required to process the packet prior to forwarding the packet.

17. The system of claim 13, wherein the ONU is configured to recalculate a cyclical redundancy check (CRC) of the packet based on the residence time.

18. The system of claim 10, wherein the residence time comprises a downstream residence time,
wherein the ONU is configured to the packet back from the client device after forwarding the packet to the client device, and
wherein the OLT is further configured to calculate an upstream residence time of the packet, add the upstream residence time in the packet, and forward the packet to the grandmaster clock.

19. The system of claim 18,
wherein the OLT is configured to receive, from the client device, a delay request packet, add an upstream residence time value to a time stamp correction field of the delay request packet, and to forward the delay request packet to the grandmaster clock, and
wherein the ONU is configured to receive the delay request packet back from the grandmaster clock, add a downstream residence time value to the time stamp correction field of the delay request packet after receiving the delay request packet back from the grandmaster clock, and forward the delay request packet to the client device to cause the client device to synchronize a local clock of the client device to the grandmaster clock.

20. A computer-readable storage medium encoded with instruction for causing one or more programmable processors of a network having asymmetric delay to:
calculate a downstream residence time of a time synchronization protocol packet within the network;
encode the residence time into the packet;
forward the packet to a client device;
receive the packet from the client device after forwarding the packet to the client device;
calculate an upstream residence time of the packet;
encode the upstream residence time in the packet;
forward the packet to a grandmaster clock;
receive, from the client device, a delay request packet;
add an upstream residence time value to a time stamp correction field of the delay request packet;
forward the delay request packet to the grandmaster clock;
receive the delay request packet back from the grandmaster clock;
add a downstream residence time value to the time stamp correction field of the delay request packet after receiving the delay request packet back from the grandmaster clock; and
forward the delay request packet to the client device to cause the client device to synchronize a local clock of the client device to the grandmaster clock.

21. The computer-readable storage medium of claim 20, wherein the time synchronization protocol packet comprises a precision time protocol packet.

22. The computer-readable storage medium of claim 21, wherein the instructions to encode the residence time into the packet comprise instructions to set a value of a time stamp correction field according to the residence time.

23. The computer-readable storage medium of claim 20, wherein the instructions to calculate the residence time comprise instructions to:
determine a time at which the packet was received by the network;
determine a time at which the packet will exit the network; and
calculate the difference between the time at which the packet will exit the network and the time at which the packet was received by the network.

24. The computer-readable storage medium of claim 23, further comprising instructions to provide an indication of the time at which the packet was received to an ONU of the network.

25. The computer-readable storage medium of claim 24, wherein the instructions to provide the indication comprise instructions to append a temporary field to the packet, wherein the temporary field comprises a value representative of the time at which the packet was received by the network.

26. The computer-readable storage medium of claim 23, wherein the instructions to determine the time at which the packet will exit the network comprise instructions to estimate an amount of time required to process the packet prior to forwarding the packet.

27. The computer-readable storage medium of claim 23, further comprising instructions to recalculate a cyclical redundancy check (CRC) of the packet based on the encoded residence time.

28. The computer-readable storage medium of claim 23, further comprising instructions to:
receive the packet from an upstream network device;
calculate a link delay from the upstream network device to the network; and
wherein the instructions to encode the residence time further comprise instructions to encode the link delay from the upstream network device and the residence time into the packet.

* * * * *